United States Patent
Hu et al.

(10) Patent No.: US 10,624,048 B2
(45) Date of Patent: Apr. 14, 2020

(54) DEVICE IN WIRELESS COMMUNICATION SYSTEM AND METHOD

(71) Applicants: Bingshan Hu, Beijing (CN); Chen Sun, Beijing (CN); Xin Guo, Beijing (CN); Penshun Lu, Beijing (CN)

(72) Inventors: Bingshan Hu, Beijing (CN); Chen Sun, Beijing (CN); Xin Guo, Beijing (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/760,502

(22) PCT Filed: Sep. 22, 2016

(86) PCT No.: PCT/CN2016/099718
§ 371 (c)(1),
(2) Date: Mar. 15, 2018

(87) PCT Pub. No.: WO2017/050249
PCT Pub. Date: Mar. 30, 2017

(65) Prior Publication Data
US 2018/0263002 A1    Sep. 13, 2018

(30) Foreign Application Priority Data
Sep. 23, 2015 (CN) ............................ 2015 1 0611829

(51) Int. Cl.
*H04W 52/54* (2009.01)
*H04W 16/06* (2009.01)
(Continued)

(52) U.S. Cl.
CPC ............. *H04W 52/54* (2013.01); *H04L 5/001* (2013.01); *H04W 16/06* (2013.01); *H04W 16/14* (2013.01);
(Continued)

(58) Field of Classification Search
CPC ..................................................... H04W 52/54
See application file for complete search history.

(56) References Cited

U.S. PATENT DOCUMENTS

2008/0176521 A1* 7/2008 Singh .................. H04W 52/287
455/69
2009/0117931 A1* 5/2009 Shin .................... H04W 52/146
455/522

(Continued)

FOREIGN PATENT DOCUMENTS

CN         102256258 A       11/2011

OTHER PUBLICATIONS

U.S. Appl. No. 62/207,937 (Year: 2015).*
International Search Report dated Dec. 12, 2016, in PCT/CN2016/099718 filed Sep. 22, 2016.

*Primary Examiner* — Kevin M Cunningham
(74) *Attorney, Agent, or Firm* — Xsensus LLP

(57) ABSTRACT

A main carrier on a licensed frequency band and a plurality of auxiliary carriers on an unlicensed frequency band exist in a wireless communication system, and a device at a base-station side in the wireless communication system includes: a controller configured to conduct power adjustment according to a result of detecting the usability of the plurality of auxiliary carriers, to enable a predetermined transmission power pre-allocated to one or more unavailable auxiliary carriers to be allocated to an auxiliary carrier to be used in available auxiliary carriers; and a communication unit configured to send a power adjustment result of the control unit to a user equipment, wherein the power adjustment result at least includes information instructing whether the power allocation changes.

17 Claims, 17 Drawing Sheets

(51) Int. Cl.
*H04L 5/00* (2006.01)
*H04W 16/14* (2009.01)
*H04W 52/14* (2009.01)
*H04W 52/34* (2009.01)
*H04W 72/04* (2009.01)

(52) U.S. Cl.
CPC ......... *H04W 52/143* (2013.01); *H04W 52/34* (2013.01); *H04W 72/0406* (2013.01); *H04W 52/146* (2013.01)

(56) References Cited

U.S. PATENT DOCUMENTS

| | | | |
|---|---|---|---|
| 2010/0238879 A1* | 9/2010 | Jeon | H04W 52/08 370/329 |
| 2013/0182675 A1* | 7/2013 | Ahn | H04L 1/1861 370/329 |
| 2016/0227416 A1* | 8/2016 | Suzuki | H04W 72/0453 |
| 2017/0048861 A1* | 2/2017 | Choi | H04L 5/0055 |
| 2018/0212740 A1* | 7/2018 | Bhorkar | H04L 1/0026 |
| 2018/0242364 A1* | 8/2018 | Park | H04W 74/00 |

\* cited by examiner

| bit bit bit 0 1 2 | bit bit bit 3 4 5 | bit bit bit 6 7 8 | bit bit bit 9 10 11 | bit bit bit 12 13 14 | ...... |
|---|---|---|---|---|---|
| TDD configuration of primary component carrier | downlink power offset of secondary component carrier 1 | downlink power offset of secondary component carrier 2 | downlink power offset of secondary component carrier 3 | downlink power offset of secondary component carrier 4 | padding bits |
| payload size of DCI format 1C ||||||

Figure 3

DEVICE IN WIRELESS COMMUNICATION SYSTEM AND METHOD

This application claims the priority to a Chinese Patent Application No. 201510611829.X, titled "DEVICE IN WIRELESS COMMUNICATION SYSTEM AND METHOD" and filed with the Chinese State Intellectual Property Office on Sep. 23, 2015, which is incorporated herein by reference in its entirety.

FIELD

The present disclosure relates to the technical field of wireless communications, and in particular to a device and a method capable of optimizing spectrum utilization efficiency on an unlicensed band by properly designing a power allocation mechanism for LAA-LTE (Licensed Assisted Access using LTE) communications in a wireless communication network.

BACKGROUND

With evolution of a wireless network, more and more services are provided, which requires additional spectrum resources to support mass data transmission. Operators of cellular radio networks start to discuss how to utilize spectrum resources on the unlicensed bands such as 5 GHz ISM (Industrial Scientific Medical) band on the basis of using the existing LTE network. On the other hand, more and more WiFi systems are being deployed on the unlicensed bands in WiFi wireless industry. The communication systems of different operators have equal rights to use the unlicensed bands. Therefore, it is desired in the industry to solve the problem of how to use the same unlicensed band fairly and effectively. At present, the industry commonly reaches a consensus that the unlicensed bands should be used with the assistance of a licensed band and provide services to terminals in a manner of carrier aggregation.

When performing data transmission on the unlicensed bands, each unlicensed band or each carrier operating on the unlicensed band may have a restriction on a maximum transmission power, which varies according to regulations in different countries or regions. Energy detection shall be performed before transmitting data on the unlicensed band, thus if a fixed power is allocated to each carrier, once the energy detection on a certain carrier is failed, which means that the carrier is unavailable, the power allocated to the carrier will be wasted. Therefore, the inventor considers adding this power to a carrier for which the energy detection is successful, which may significantly improve system performance.

Furthermore, if a base station (such as an eNB) has performed power adjustment but fails to timely notify the user equipment of the adjustment, on one hand, for downlink transmission, CSI (Channel Status Information) measurement and RRM (Radio Resource Management) measurement results (such as RSRP (Reference Signal Reception Power) and/or RSRQ (Reference Signal Reception Quality)) of the user equipment, which are very important for operations such as system resource scheduling, link adaptation (such as modulation coding scheme selection), cell configuration, activation, deactivation and mobility management (cell handover, cell selection), load transfer and the like, may be affected; and on the other hand, for uplink transmission, since a transmission power on the carrier for the uplink transmission of the user equipment is also controlled by the base station, the base station should also notify the user equipment of the power adjustment result for the user equipment to perform uplink data transmission according to the power adjustment result.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problems, an object of the present disclosure is to provide a device and a method in a wireless communication system, which effectively improve the system performance and the spectrum utilization efficiency by adding power allocated to a carrier for which energy detection is failed on an unlicensed band to a carrier for which the energy detection is successful on the unlicensed band and notifying the power adjustment to a user equipment.

According to an aspect of the present disclosure, there is provided a device on a base station side in a wireless communication system in which there are a primary component carrier on a licensed band and a plurality of secondary component carriers on an unlicensed band. The device includes: a control unit configured to perform, according to an availability detection result for the plurality of secondary component carriers, power adjustment so that predetermined transmission power pre-allocated to one or more unavailable secondary component carriers is allocated to a secondary component carrier to be used among available secondary component carriers; and a communication unit configured to send a power adjustment result of the control unit to a user equipment, the power adjustment result including at least information indicating whether power allocation is changed.

According to a preferred embodiment of the present disclosure, the power adjustment result further includes information indicating an offset amount of the power adjustment.

According to another preferred embodiment of the present disclosure, the communication unit is further configured to interact, via X2 signaling, the availability detection result and the power adjustment result with a neighboring base station of the base station.

According to another preferred embodiment of the present disclosure, the control unit is further configured to select, according to a result of the interaction, the secondary component carrier to be used from the plurality of secondary component carriers.

According to another preferred embodiment of the present disclosure, the control unit is further configured to activate/deactivate the plurality of secondary component carriers according to a result of the interaction.

According to another preferred embodiment of the present disclosure, the device further includes: a detecting unit configured to detect availability of the plurality of secondary component carriers to determine the unavailable secondary component carriers and the available secondary component carriers; and a power control information generating unit configured to generate power control information including the power adjustment result. The control unit is further configured to perform the power adjustment according to a detection result of the detecting unit, and the communication unit is further configured to send the power control information to the user equipment and perform downlink signal transmission to the user equipment according to the power adjustment result.

According to another preferred embodiment of the present disclosure, the power control information generating unit is further configured to generate the power control information for each of the plurality of secondary component carriers.

According to another preferred embodiment of the present disclosure, the power control information is downlink control information (DCI) format 1A/1B/1D/1/2A/2/2B/2C/2D.

According to another preferred embodiment of the present disclosure, the power control information reuses information bits for transmission power control of Physical Uplink Control Channel (PUCCH) in the DCI format 1A/1B/1D/1/2A/2/2B/2C/2D or padding bits in the DCI format 1A/1B/1D/1/2A/2/2B/2C/2D to notify the power adjustment result to the user equipment.

According to another preferred embodiment of the present disclosure, the power control information generating unit is further configured to generate the power control information common to the plurality of secondary component carriers.

According to another preferred embodiment of the present disclosure, the power control information is downlink control information (DCI) format 1C.

According to another preferred embodiment of the present disclosure, the power control information reuses information bits for uplink/downlink configuration of time division duplexing or padding bits in the DCI format 1C to notify the power adjustment result to the user equipment.

According to another preferred embodiment of the present disclosure, the power control information is media access control (MAC) layer control information or radio resource control (RRC) layer control information.

According to another preferred embodiment of the present disclosure, the communication unit is further configured to send, over the primary component carrier or the available secondary component carriers, downlink control information (DCI) format 1A/1B/1D/1/2A/2/2B/2C/2D to the user equipment.

According to another preferred embodiment of the present disclosure, the communication unit is further configured to send uplink scheduling grant signaling for the plurality of secondary component carriers to the user equipment, and receive the availability detection result for the plurality of secondary component carriers reported by the user equipment according to the uplink scheduling grant signaling. The control unit is further configured to perform the power adjustment according to the availability detection result from the user equipment, and the communication unit is further configured to include the power adjustment result in the uplink scheduling grant signaling to send it to the user equipment in a next cycle.

According to another preferred embodiment of the present disclosure, the device further includes a detecting unit configured to detect availability of a specific secondary component carrier among the plurality of secondary component carriers, and the communication unit is further configured to send, if the detecting unit detects that the specific secondary component carrier is available, the uplink scheduling grant signaling to the user equipment over the specific secondary component carrier.

According to another preferred embodiment of the present disclosure, the communication unit is further configured to send the uplink scheduling grant signaling to the user equipment over the primary component carrier.

According to another preferred embodiment of the present disclosure, the control unit is further configured to perform the power adjustment by allocating resource blocks to be used for transmission blocks transmitted by the one or more unavailable secondary component carriers to a transmission block transmitted by the secondary component carrier to be used among the available secondary component carriers or by adjusting a modulation coding scheme to be used for the transmission block transmitted by the secondary component carrier to be used among the available secondary component carriers.

According to another preferred embodiment of the present disclosure, the control unit is further configured to recognize a reason of uplink data transmission failure according to the availability detection result from the user equipment, so as to adjust a size of a contention window of the plurality of secondary component carriers.

According to another aspect of the present disclosure, there is further provided a device on a user equipment side in a wireless communication system. The device includes: a receiving unit configured to receive a power adjustment result from a base station, where the power adjustment result is obtained by performing, by the base station, power adjustment according to an availability detection result for a plurality of secondary component carriers on an unlicensed band, so that predetermined transmission power pre-allocated to one or more unavailable secondary component carriers is allocated to a secondary component carrier to be used among available secondary component carriers, the power adjustment result including at least information indicating whether power allocation is changed; and a control unit configured to perform a corresponding operation according to the power adjustment result.

According to another aspect of the present disclosure, there is provided a method on a base station side in a wireless communication system in which there are a primary component carrier on a licensed band and a plurality of secondary component carriers on an unlicensed band. The method includes: a control step of performing, according to an availability detection result for the plurality of secondary component carriers, power adjustment so that predetermined transmission power pre-allocated to one or more unavailable secondary component carriers is allocated to a secondary component carrier to be used among available secondary component carriers; and a communication step of sending a power adjustment result to a user equipment, the power adjustment result including at least information indicating whether power allocation is changed.

According to another aspect of the present disclosure, there is further provided a method on a user equipment side in a wireless communication system, the method including: a receiving step of receiving a power adjustment result from a base station, where the power adjustment result is obtained by performing, by the base station, power adjustment according to an availability detection result for a plurality of secondary component carriers on an unlicensed band, so that predetermined transmission power pre-allocated to one or more unavailable secondary component carriers is allocated to a secondary component carrier to be used among available secondary component carriers, the power adjustment result including at least information indicating whether power allocation is changed; and a control step of performing a corresponding operation according to the power adjustment result.

According to another aspect of the present disclosure, an electronic device is further provided. The electronic device may include a transceiver and one or more processors, and the one or more processors may be configured to perform the methods or functions of the units in the wireless communication system according to the present disclosure.

According to another aspect of the present disclosure, there are further provided computer program codes and a computer program product for implementing the methods of the present disclosure, and a computer readable storage medium on which the computer program codes for implementing the methods of the present disclosure are recorded.

According to the present disclosure, the system performance can be optimized and the spectrum utilization efficiency can be improved by dynamically adjusting the power allocation for the secondary component carriers on the unlicensed band and notifying the power adjustment to the user equipment.

Other aspects of embodiments of the present disclosure are given in the following parts of the description, in which detailed illustration is used to fully disclose preferred ones of the embodiments of the present disclosure rather than to limit the present disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings:

FIG. 3 is a schematic diagram illustrating an example of a signaling format of DCI format 1C for indicating a power adjustment result according to an embodiment of the present disclosure;

DETAILED DESCRIPTION

Figure 1:
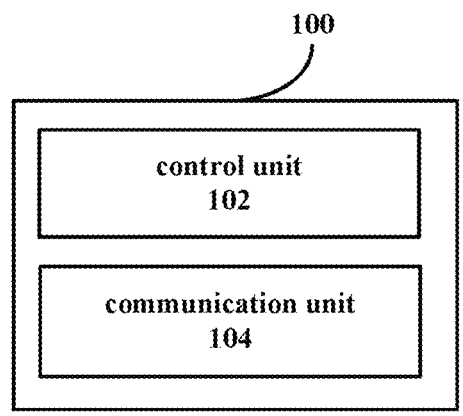
FIG. 1 is a block diagram illustrating an example of functional configuration of a device on a base station side in a wireless communication system according to an embodiment of the present disclosure.

Exemplary embodiments of the present disclosure will be described below in conjunction with the accompanying drawings. For the sake of clarity and conciseness, not all the features of actual implementations are described in the specification. However, it is to be appreciated that numerous implementation-specific decisions shall be made during developing any of such actual implementations so as to achieve the developer's specific goals, for example, to comply with system- and business-related constraining conditions which will vary from one implementation to another. Moreover, it shall also be appreciated that such a developing effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Next, embodiments of the present disclosure are described in detail with reference to FIG. 1 to FIG. 20.

First, an example of functional configuration of a device on a base station side in a wireless communication system according to an embodiment of the present disclosure is described with reference to FIG. 1. FIG. 1 is a block diagram illustrating an example of functional configuration of a device on a base station side in a wireless communication system according to an embodiment of the present disclosure.

Referring to FIG. 1, a device 100 according to the present embodiment may include a control unit 102 and a communication unit 104. The functional configurations of the respective units are described in detail below.

The present disclosure relates to an LAA-LTE communication system, in which there are a primary component carrier (PCC) operating on a licensed band and multiple secondary component carrier (SCC) operating on an unlicensed band, and supports carrier aggregation (CA). The unlicensed band may be a licensed band of a non-cellular network, such as a WiFi band of 2.4 GHz or 5 GHz, a television band or a radar band. It should be noted that, in the existing LTE standard, carrier aggregation among at most 5 component carriers (i.e., one primary component carrier and four secondary component carriers) is generally supported. Therefore, the technology of the present disclosure is described on the basis of this scene, but is not limited thereto. With the development of the mobile communication technology in the future, the technology of the present disclosure can be also applied to the carrier aggregation among more carriers. In addition, it should be noted that, in the conventional technology, each cell generally corresponds to a carrier at a certain frequency. For example, a primary cell (Pcell) corresponds to a primary component carrier (PCC), and a secondary cell (Scell) corresponds to a secondary component carrier (SCC). Therefore, in the present disclosure, references to a cell and a carrier are not strictly distinguished from each other, the meanings of which may be understood by those skilled in the art.

The control unit 102 may be configured to perform, according to an availability detection result for a plurality of secondary component carriers on the unlicensed band, power adjustment so that predetermined transmission power pre-allocated to one or more unavailable secondary component carriers is allocated to secondary component carrier(s) to be used among available secondary component carriers.

Before using any secondary component carrier on the unlicensed band, energy detection should be performed on the secondary component carrier to determine whether the secondary component carrier is available. If it is detected that the secondary component carrier is not available, the transmission power pre-allocated to the secondary component carrier may be wasted. Therefore, it is necessary to perform dynamic adjustment on the transmission power of the secondary component carriers. It may be considered to add the predetermined transmission power of the detected one or more unavailable secondary component carriers (for which the energy detection is failed) to available secondary component carrier(s) to be used, so as to enhance the transmission power of the available secondary component carrier(s) and improve the transmission performance. In the following description, the technology of the present disclosure will be described in detail for the case of uplink transmission and the case of downlink transmission respectively.

The communication unit 104 may be configured to send a power adjustment result of the control unit 102 to a user equipment.

As described above, for both the uplink transmission and the downlink transmission, the base station should timely notify the user equipment of the power adjustment result. Therefore, in the technical solution of the present disclosure, the power adjustment result is sent to the user equipment via physical layer signaling. The power adjustment result may include at least information indicating whether power allocation is changed, so as to timely notify the user equipment that the power allocation is changed. Preferably, the power adjustment result may further include information indicating an offset amount of the power adjustment. It should be noted that, although in the following description variation in the power allocation and the offset amount are both notified to the user equipment via the physical layer signaling, the offset amount may be alternatively sent to the user equipment via MAC signaling or higher layer signaling (e.g., radio resource control (RRC) signaling) instead of the physical layer signaling, so that the user equipment can obtain the offset amount of the power adjustment by parsing the signaling in the corresponding layer, which is not limited in the present disclosure.

In the following description, the technical solution of the present disclosure will be described in detail for the case of downlink transmission and the case of uplink transmission respectively.

Power Allocation for Downlink Transmission

Figure 2:
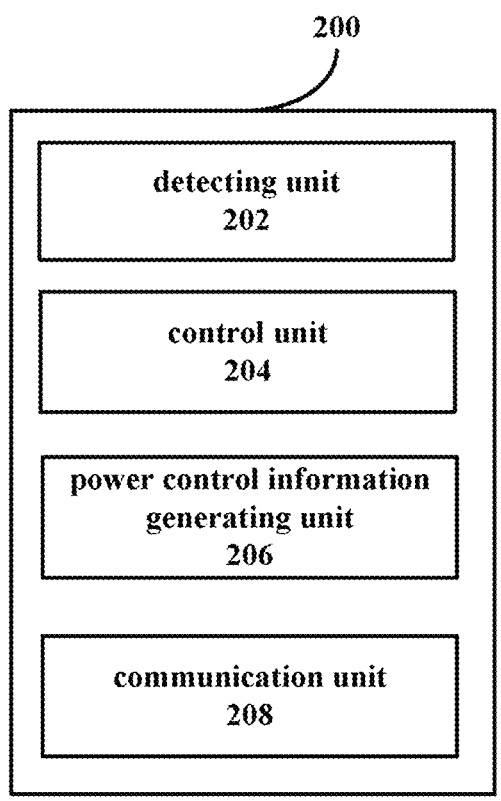
FIG. 2 is a block diagram illustrating an example of functional configuration of a device on a base station side in a wireless communication system according to another embodiment of the present disclosure.

FIG. 2 is a block diagram illustrating an example of functional configuration of a device on a base station side in a wireless communication system according to another embodiment of the present disclosure.

Referring to FIG. 2, a device 200 according to the embodiment may include a detecting unit 202, a control unit 204, a power control information generating unit 206 and a communication unit 208. The control unit 204 and the communication unit 208 have substantially the same functional configuration as those of the control unit 102 and the communication unit 104 described above with reference to FIG. 1, which will not be repeated herein. Only the functional configurations of the detecting unit 202 and the power control information generating unit 206 are described in detail below.

The detecting unit 202 may be configured to detect availability of the plurality of secondary component carriers to determine the unavailable secondary component carriers and the available secondary component carriers.

Specifically, the base station performs energy detection on the secondary component carriers before performing downlink data transmission to the user equipment, identifies a secondary component carrier for which the energy detection is successful as an available secondary component carrier, and identifies a secondary component carrier for which the energy detection is failed as an unavailable secondary component carrier.

Then, the control unit 204 may perform power adjustment according to the detection result of the detection unit 202, i.e., add the predetermined power allocated to the unavailable secondary component carrier(s) to the available secondary component carrier(s) to be used. For example, it is assumed that each of four secondary component carriers SCC1 to SCC4 is allocated with power P, and if the detecting unit 202 detects that SCC3 and SCC4 are unavailable, the control unit 204 may add the transmission power allocated to SCC3 and SCC4 to SCC1 and SCC2 respectively, so that the adjusted transmission power of both SCC1 and SCC2 is 2P. Alternatively, as an example, the transmission power allocated to SCC3 and SCC4 may be both added to SCC1 while the transmission power of SCC2 remains unchanged, so that the adjusted transmission power of SCC1 is 3P. Further, alternatively, if carrier aggregation is implemented with only SCC1 and PCC, the transmission power of SCC2 to SCC4 may be all added to SCC1 so that the adjusted transmission power of SCC1 is 4P. However, in actual transmission, in order to increase the transmission bandwidth, the carrier aggregation may be generally implemented with the PCC and both of the available secondary component carriers SCC1 and SCC2, that is, the power of SCC2 will generally not be added to SCC1.

According to the above description, those skilled in the art may adjust the transmission power of the available secondary component carrier(s) to be used as actually required, which is not specifically limited herein.

The power control information generating unit 206 may be configured to generate power control information including the power adjustment result.

Preferably, the power control information may be sent to the user equipment via physical downlink control channel (PDCCH) to timely notify the user equipment of the power adjustment result, including whether the power adjustment is changed and optionally including the offset amount of the power adjustment. In addition, preferably, the power control information may be also MAC layer control information or RRC layer control information. For example, in a case that energy detection on a certain secondary component carrier is successful, but there is no downlink data to be transmitted and the energy detection is performed only for transmission of DRS (discovery reference signal), the power adjustment result may be notified to the user equipment via MAC layer signaling or RRC signaling, since DRS occurs at a cycle of 40 ms, 80 ms or 160 ms, and it is unnecessary to occupy the physical layer signaling which has a high timeliness to transmit the power adjustment result.

The communication unit 208 may be configured to send the power control information including the power adjustment result to the user equipment and perform downlink signal transmission to the user equipment according to the power adjustment result.

It should be noted that, in the downlink transmission, the reason why it needs to timely notify the user equipment of the power adjustment result is that the transmission power may affect at least one of a CSI measurement result and a RRM measurement result (such as RSRP and/or RSRQ) of the user equipment, which in turn affects the channel condition estimation of the user equipment and subsequent operations such as resource scheduling, link adaptation (such as modulation coding scheme selection), cell configuration and mobility management (cell handover, cell selection), secondary cell activation and de-activation, load transfer or the like. For example, if current transmission power for CSI reference signal on the unlicensed band is changed but such change is not timely notified to the user equipment, the user equipment still refers to the transmission power before the adjustment when estimating the channel condition based on the CSI measurement result, which necessarily results in inaccurate estimation of the current channel condition. As another example, if transmission power for the discovery reference signal (DRS) of an LAA cell (which operates on the unlicensed band) is changed but such change is not timely notified to the user equipment, the user equipment may make a wrong decision when performing operations such as measurement event report, cell selection/reselection or the like based on the RRM measurement of the DRS.

In particular, depending on whether the power adjustment result is valid for each transmission block (specific downlink transmission) or for transmissions on all carriers used to perform the carrier aggregation within maximum channel occupation time, the present disclosure provides the following schemes to notify the user equipment of the power adjustment result.

Scheme 1

Preferably, in this case, the power control information generating unit 206 may generate the power control information for each of the plurality of secondary component carriers. That is, the power control information is valid for each transmission block, i.e., it is UE-specific.

Preferably, the power control information may be downlink control information (DCI) format 1A/1B/1D/1/2A/2/2B/2C/2D, i.e., downlink scheduling grant signaling (DL grant) carried by the DCI format 1A/1B/1D/1/2A/2/2B/2C/2D. The DCI format 1A/1B/1D/1/2A/2/2B/2C/2D and the DL grant will not be distinguished with each other hereinafter.

As an example, the power control information may reuse information bits for transmission power control of Physical Uplink Control Channel (PUCCH), i.e., transmission power control command (TPC command) of 2 bits, in the DL grant to indicate the power adjustment result. Table 1 below shows an example of using the TPC command in the DL grant signaling to indicate the power adjustment result.

TABLE 1

| TPC command field in DL grant (2 bits) | interpreted as TPC command for PUCCH | interpreted as power adjustment result |
| --- | --- | --- |
| 00 | −1 dB | No adjustment, i.e., offset amount of 0 dB |
| 01 | 0 dB | Offset amount of 3 dB |
| 10 | 1 dB | Offset amount of 4.77 dB |
| 11 | 3 dB | Offset amount of 6 dB |

In the above example, the TPC command of 2 bits is used to indicate the power adjustment result. Since at most 4 secondary component carriers are supported in the current protocols, information of 2 bits is sufficient for indicating the adjustment result. Furthermore, it is to be noted that in the above example, the offset amount of the power adjustment is also included in the power control information. However, as described above, the offset amount may be alternatively notified to the user equipment via high layer signaling (such as the RRC signaling), so that the user equipment may learn from the physical layer signaling that the power allocation is changed and obtain the offset amount of the adjustment by parsing the high layer signaling. However, in this way, the timeliness may be relatively poor. In addition, it is also to be noted that the indication meanings given in the above table are merely exemplary, and may be accordingly configured by those skilled in the art according to actual circumstances.

In this example, the power adjustment result is indicated by reusing original information bits without adding information bits, so that the original signaling structure may be maintained and the original protocol is less changed, resulting in good compatibility.

Alternatively, instead of reusing the TPC command, padding bits in the DL grant may be reused to indicate the power adjustment result. It should be understood that, although only 2 bits are used to indicate the power adjustment result, more padding bits may be reused to indicate the power adjustment result in the case that carrier aggregation among more carriers may be allowed with the development of the mobile communication technology.

It can be seen that, in the first scheme, the power adjustment result is valid for each transmission block, which has a high flexibility while causing a high signaling overhead.

In a case that, for example, the power adjustment is not performed frequently, the present disclosure further provides a second scheme below in order to save the signal overhead.

Scheme 2

Preferably, in this case, the power control information generating unit 206 may be configured to generate the power control information common to the plurality of secondary component carriers. That is, the power control information is valid for all the aggregated carriers within the whole maximum channel occupation time, i.e., it is cell-specific.

Preferably, the power control information may be DCI format 1C.

As a preferred example, the information bits for uplink/downlink configuration of time division duplexing may be reused to indicate the power adjustment result.

In the case of Rel-12, TDD configuration of each carrier (on a licensed band) may be dynamically changed by the DCI format 1C. However, on the unlicensed band, due to the time limitation for the LTE system to occupy the unlicensed band and existence of incomplete sub-frame, dynamic change of the TDD configuration may not necessarily lead to an improved system performance, and resources of information bits for carrying this content may be wasted. Therefore, in the present disclosure, the DCI format 1C is reused to notify the user equipment of the power adjustment result, so that the power adjustment result is effectively notified without adding new information bits and without changing the original signaling structure.

Below, an example of a signaling format of DCI format 1C for indicating a power adjustment result according to an embodiment of the present disclosure is described with reference to FIG. 3. FIG. 3 is a schematic diagram illustrating an example of a signaling format of DCI format 1C for indicating a power adjustment result according to an embodiment of the present disclosure.

Referring to FIG. 3, in a common example of carrier aggregation, bits in the reused DCI format 1C signaling may have the following meanings:

bits 0-2 are used to indicate the TDD configurations of the primary component carrier (7 types);

bits 3-5 are used to indicate the power adjustment result for secondary component carrier 1;

bits 6-8 are used to indicate the power adjustment result for secondary component carrier 2;

bits 9-11 are used to indicate the power adjustment result for secondary component carrier 3; and bits 12-14 are used to indicate the power adjustment result for secondary component carrier 4.

It is noted that, as described above, dynamic TDD UL/DL configuration is not required in the case that the secondary component carrier operates on the unlicensed band. In some examples, some of the plurality of secondary component carriers configured for the UE operate on the unlicensed band, while the others operate on the licensed band, and the UE may for example determine the secondary component carriers operating on the unlicensed band according to an element LAA-MainConfig in high layer signaling. For the secondary component carriers operating on the licensed band, similar to the primary component carrier, the corresponding information bits in the DCI format 1C are still used to indicate the TDD UL/DL configuration. In other words, the indication bits for only some of the secondary component carriers may be changed in the DCI format 1C.

Power change of each secondary component carrier may be indicated with 3 information bits. As an example, the 3 bits information for each secondary component carrier may have the following meanings:

TABLE 2

| corresponding information bits in DCI format 1C (3 bits) | interpreted as power adjustment result |
|---|---|
| 000 | No adjustment, i.e., offset amount of 0 |
| 001 | 1 times the offset amount |
| 010 | 2 times the offset amount |
| 011 | 3 times the offset amount |
| 100 | 4 times the offset amount |
| 101 | 5 times the offset amount |
| 110 | 6 times the offset amount |
| 111 | 7 times the offset amount |

With the reuse of DCI format 1C as shown in FIG. 3, the power adjustment result may be effectively notified.

As another preferred example, similar to the above scheme 1, padding bits in the DCI format 1C may be reused to indicate the power adjustment result, instead of changing the original meanings of the information bits for the TDD configuration in the DCI format 1C.

In addition, similar to the above scheme 1, in this example, the offset amount of the power adjustment is also included in the power control information. However, the offset amount may be alternatively notified to the user equipment via high layer signaling (such as the RRC signaling), so that the user equipment may learn from the physical layer signaling that the power allocation is changed and obtain the specific offset amount of the adjustment by parsing the high layer signaling. In addition, it is also to be noted that the indication meanings given in the above table are merely exemplary, and may be configured by those skilled in the art according to actual circumstances.

In can be seen that, in the scheme 2, the power control information is valid for all the aggregated carriers within the whole maximum channel occupation time, which significantly reduces signaling overhead but has low flexibility, as compared with the scheme 1.

The scheme 1 or 2 may be selected by those skilled in the art according to the actual network conditions to optimize the network performance.

Alternatively, in addition to the above two schemes, the schemes 1 and 2 may be combined to indicate richer information. This scheme is especially useful for a case in which carrier aggregation among up to 32 carriers may be supported and a case of frame-based energy detection in the future. The third scheme is described in detail below.

Scheme 3: Combination of Scheme 1 and Scheme 2

In this scheme, the power adjustment result may be indicated by reusing the information bits for TDD configuration or the padding bits (information of 3 bits for each secondary component carrier) in the DCI format 1C together with the TPC command field or the padding bits (information of 2 bits) in the DL grant. Since 5 bits are used for each secondary component carrier, up to 32 states can be indicated. As an example, the meanings of the information bits in the scheme 3 are shown as follows.

TABLE 3

| corresponding information bits in DCI format 1C (3 bits) | interpreted as power adjustment result |
|---|---|
| 000 | 0-3 times the offset amount |
| 001 | 4-7 times the offset amount |

TABLE 3-continued

| corresponding information bits in DCI format 1C (3 bits) | interpreted as power adjustment result |
|---|---|
| 010 | 8-11 times the offset amount |
| 011 | 12-15 times the offset amount |
| 100 | 16-19 times the offset amount |
| 101 | 20-23 times the offset amount |
| 110 | 24-27 times the offset amount |
| 111 | 28-31 times the offset amount |

That is, firstly, a power adjustment section for each secondary component carrier may be determined according to the indication information for the secondary component carrier in the DCI format 1C. Next, the specific adjustment amount for the secondary component carrier in the section may be determined according to the indication information in the DL grant. For example, if the power adjustment section is determined as 16-19 times the offset amount according to the DCI format 1C, the specific power adjustment amount may be determined according to the TPC command information as shown in Table 4.

TABLE 4

| TPC command field in DL grant (2 bits) | interpreted as power adjustment result |
|---|---|
| 00 | 16 times the offset amount |
| 01 | 17 times the offset amount |
| 10 | 18 times the offset amount |
| 11 | 19 times the offset amount |

It is to be understood that the meanings of the information bits given above are only exemplary, and may be designed by those skilled in the art according to actual circumstances, which will not be limited herein.

Figure 4:
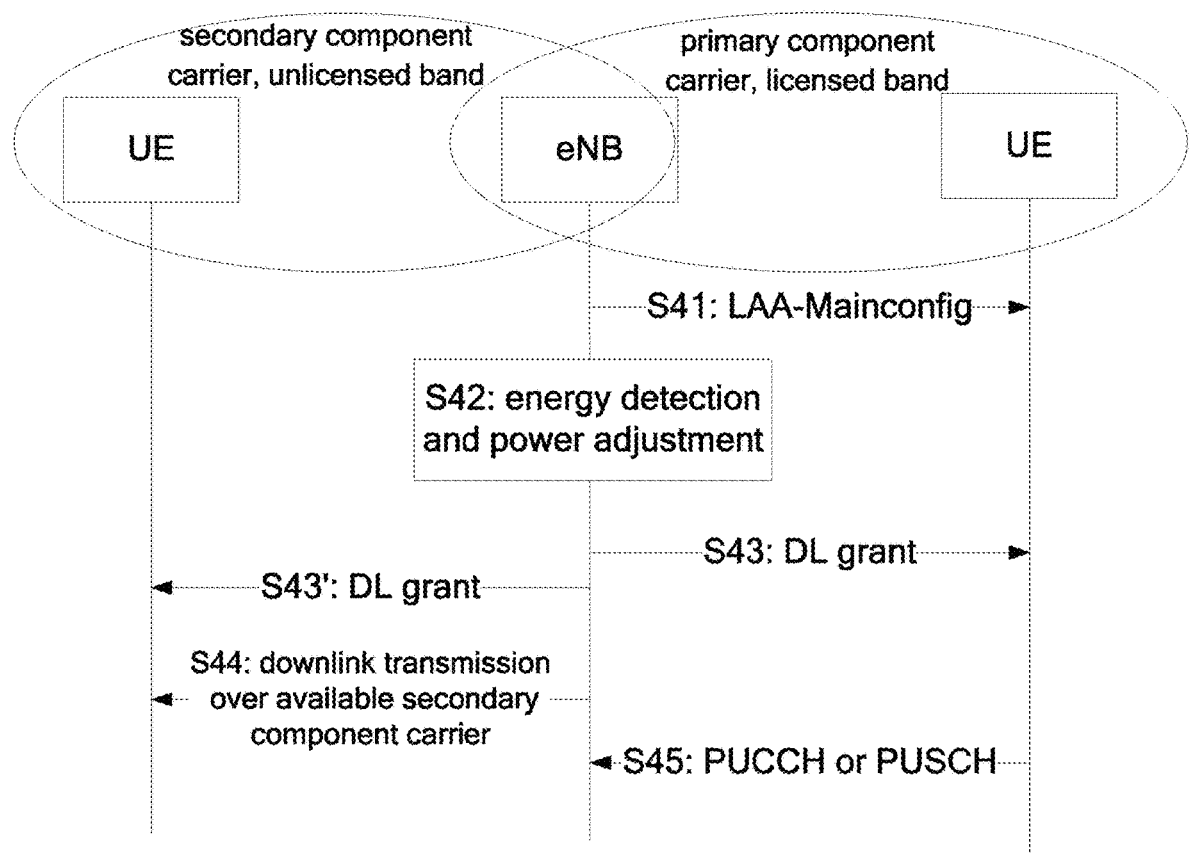
FIG. 4 is a flowchart illustrating a signaling interaction procedure of a first implementation scheme for downlink transmission according to an embodiment of the present disclosure.

In order to better understand the above schemes, the signaling interaction procedures in the scheme 1 and scheme 2 are respectively provided with reference to FIG. 4 to FIG. 7. FIG. 4 is a flowchart illustrating a signaling interaction procedure of a first implementation scheme for downlink transmission according to an embodiment of the present disclosure.

Referring to FIG. 4, in step S41, the base station (eNB) configures a secondary cell supporting LAA for the user equipment, LAA-MainConfig, via the RRC signaling. Then, in step S42, the eNB performs energy detection on each of the secondary component carriers to determine whether they are available, and performs the power adjustment described above according to the detection result. Next, in a case of cross-carrier scheduling, the eNB transmits the DL grant (i.e., the DCI format 1A/1B/1D/1/2A/2/2B/2C/2D, in which the TP command or padding bits are reused) including the power adjustment result to the user equipment via the primary component carrier in step S43. On the other hand, in a case of self-carrier scheduling, as in step S43', the eNB transmits the DL grant including the power adjustment result to the user equipment via an available secondary component carrier (i.e., the secondary component carrier which is detected as being idle). Next, in step S44, the eNB performs the downlink transmission to the user equipment via the available secondary component carrier. Then in step S45, the user equipment feeds back to the base station via PUCCH or PUSCH to notify whether the user equipment has received a signal (i.e., a process of downlink hybrid automatic retransmission request (HARQ)).

Figure 5:
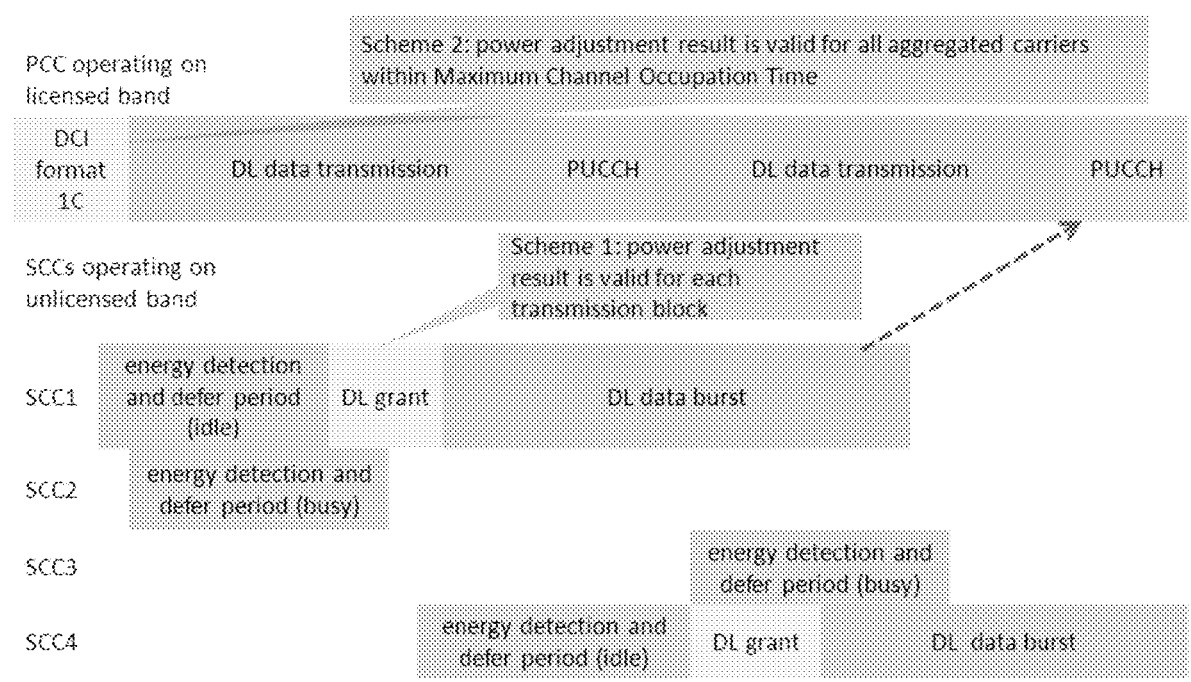
FIG. 5 is a schematic diagram illustrating a time sequence of power adjustment and indication for downlink transmission according to an embodiment of the present disclosure.

The signaling interaction procedure described with reference to FIG. 4 may be better understood with reference to the time sequence diagram in FIG. 5. FIG. 5 is a schematic diagram illustrating a time sequence of power adjustment and indication for downlink transmission according to an embodiment of the present disclosure.

Referring to FIG. 5, energy detection is performed on each of the secondary component carriers SCC1 to SCC4, and the power allocated to the secondary component carriers SCC2 and SCC3 for which the energy detection is failed (i.e., which are unavailable) is added to the available secondary component carriers SCC1 and SCC4, and the result is sent to the user equipment via the DL grant. Next, downlink transmission to the user equipment may be performed over SCC1 and SCC4. It can be seen that, the power adjustment result included in the DL grant is valid for the individual secondary component carrier (i.e., each transmission block). Therefore, this scheme has the greatest flexibility, but significantly increases the signaling overhead.

Next, a flowchart of a signaling interaction procedure of a second implementation scheme for downlink transmission according to an embodiment of the present disclosure is described with reference to FIG. 6.

Figure 6:
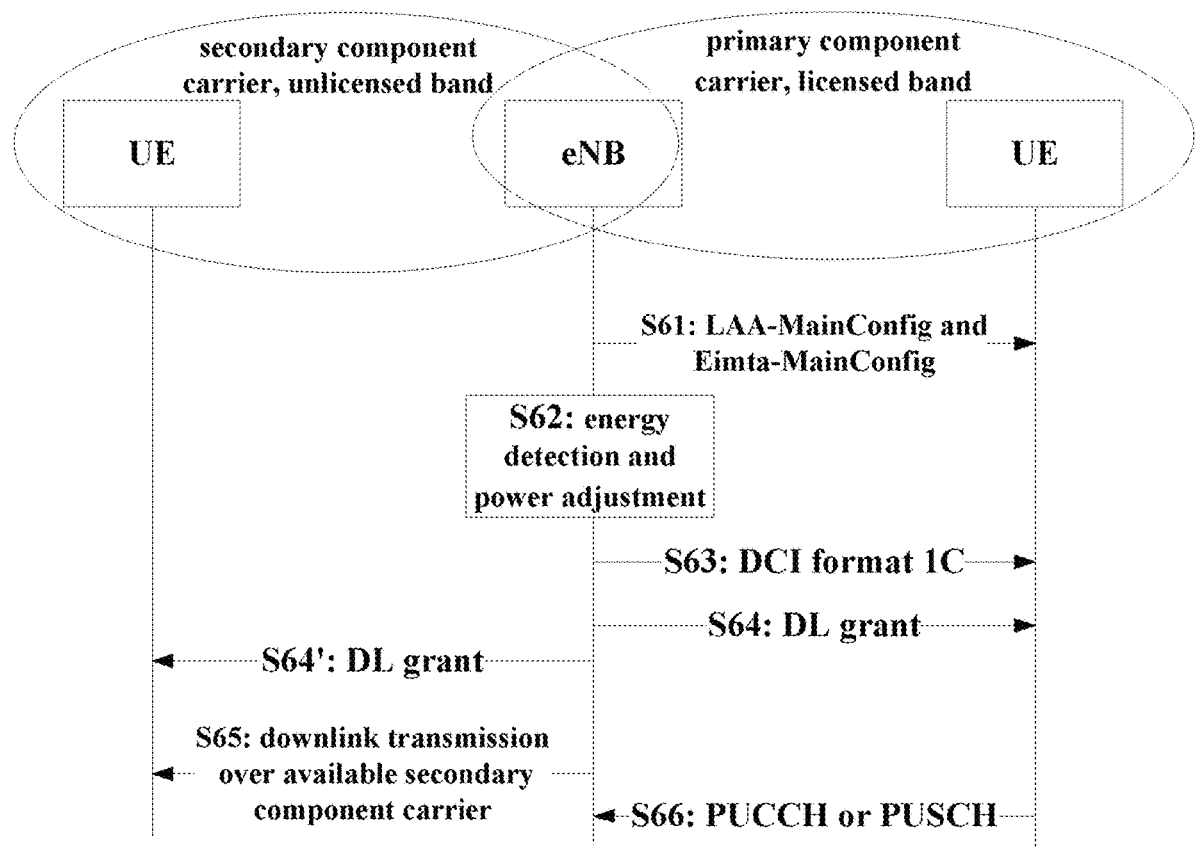
FIG. 6 is a flowchart illustrating a signaling interaction procedure of a second implementation scheme for downlink transmission according to an embodiment of the present disclosure.

Referring to FIG. 6, firstly, in step S61, the eNB configures the signaling LAA-MainConfig which indicates supporting LAA and the signaling eIMTA-Mainconfig which indicates supporting eIMTA (enhanced Interference Management For Traffic Adaption) via the RRC signaling. Then, in step S62, the eNB performs the energy detection on each of the secondary component carriers to determine whether they are available, and performs the power adjustment described above according to the detection result. Next, the eNB transmits the DCI format 1C, in which the information bits for the TDD configuration or padding bits are reused, including the power adjustment result to the user equipment via the primary component carrier in step S63. Next, in a case of cross-carrier scheduling, the eNB transmits the DL grant to the user equipment via the primary component carrier in step S64. On the other hand, in a case of self-carrier scheduling, as in step S64', the eNB transmits the DL grant to the user equipment via the secondary component carrier which is detected as available. Next, in step S65, the eNB performs the downlink transmission to the user equipment via the secondary component carrier detected as available. Finally, in step S66, the user equipment feeds back to the base station via PUCCH or PUSCH to notify whether the user equipment has received a signal (i.e., a process of downlink hybrid automatic retransmission request (HARQ)).

The signaling interaction procedure described with reference to FIG. 6 may be better understood with reference to the time sequence diagram in FIG. 5. It can be seen that, the DCI format 1C transmitted to the user equipment via the primary component carrier is valid for all the aggregated carriers, i.e. all the secondary component carriers SCC1 to SCC4, within the maximum channel occupation time. Therefore, this scheme may have a poor flexibility, but may save the signaling overhead.

In addition, it is to be noted that in the cross-carrier scheduling of downlink transmission, the DL grant for the second secondary component carrier may be transmitted via the first secondary component carrier detected as available instead of the primary component carrier, which is not described in detail herein.

It is to be understood that the above signal interaction procedure is merely exemplary rather than restrictive, and those skilled in the art may modify the above signal interaction procedure according to the principle of the disclosure. For example, the transmission of DL grant and the downlink transmission are not necessarily performed in separate two steps, but may be performed concurrently in the same step. In addition, for example, for the second implementation scheme described with reference to FIG. 6, if the power adjustment result is notified to the user equipment via both the DCI format 1C and the DL grant, this scheme may be modified as the above third implementation scheme.

Power Control for Uplink Transmission

The case of downlink transmission has been described above, and the case of uplink transmission will be described below with reference back to FIG. 1.

In the case of uplink transmission, the communication unit 104 may be further configured to transmit uplink scheduling grant signaling (UL grant), i.e., DCI format 0/4, for the plurality of secondary component carriers to the user equipment.

It is to be understood that, in the case of cross-carrier scheduling, the eNB transmits the UL grant to the user equipment via the primary component carrier, and thus the eNB needs not to perform the energy detection before transmitting the UL grant. On the other hand, in the case of self-carrier scheduling, since the eNB transmits the UL grant to the user equipment via the secondary component carrier, the eNB needs to perform the energy detection on the secondary component carrier before transmitting the UL grant to determine whether the secondary component carrier is available, and transmits the UL grant to the user equipment over the secondary component carrier if the secondary component carrier is available. The case of self-carrier scheduling will be described in detail with reference to FIG. 7 below.

The user equipment which receives the UL grant may perform the energy detection on the secondary component carrier to determine whether the secondary component carrier is available, and reports the detection result to the eNB. Therefore, the communication unit 104 may be further configured to receive an availability detection result for the plurality of secondary component carriers reported by the user equipment according to the received uplink scheduling grant signaling, and the control unit 102 may be configured to perform uplink power adjustment according to the received availability detection result, i.e., adding the power pre-allocated to the unavailable secondary component carrier(s) to the available secondary component carrier(s) to be used.

In the uplink power adjustment scheme, the control unit 102 may be preferably configured to perform the power adjustment by allocating resource blocks (RBs) to be used for transmission blocks transmitted by the one or more unavailable secondary component carriers to a transmission block transmitted by the secondary component carrier(s) to be used among the available secondary component carriers or by adjusting a modulation coding scheme to be used for the transmission block(s) transmitted by the secondary component carrier(s) to be used among the available secondary component carriers.

Since the transmission power $P_{RB}$ for each resource block is predetermined and is not adjustable, in the uplink power adjustment, the power ($P_{TB}$) for a transmission block transmitted by each of the secondary component carriers may be adjusted by allocating the resource blocks allocated to the unavailable secondary component carrier(s) to the secondary component carrier(s) to be used. That is, the power for the transmission block(s) transmitted by the secondary component carrier(s) to be used is increased by increasing the number of resource blocks to be used for the transmission block(s) transmitted by the secondary component carrier(s) to be used, or may be also adjusted by adjusting the modulation coding scheme to be used for the transmission block(s).

It is to be noted that, the power adjustment made by the eNB according to the availability detection result for each of the secondary component carriers reported by the user equipment will not affect the current transmission, and the communication unit 104 may include the power adjustment result in the UL grant to send it to the user equipment in the next cycle, so as to perform power control for the uplink data transmission of the user equipment in the next cycle.

Further preferably, the control unit 102 may further recognize, according to the availability detection result from the user equipment, a reason of uplink data transmission failure, for example, whether the transmission failure is caused by not sending the data by the user equipment or the channel being unavailable, so as to adjust a size of a contention window of the plurality of secondary component carriers. For example, if it is detected that one or more secondary component carriers are unavailable, the size of the contention window of the available secondary component carrier(s) may be accordingly reduced to shorten back-off time, thereby improving the resource utilization efficiency.

Figure 7:
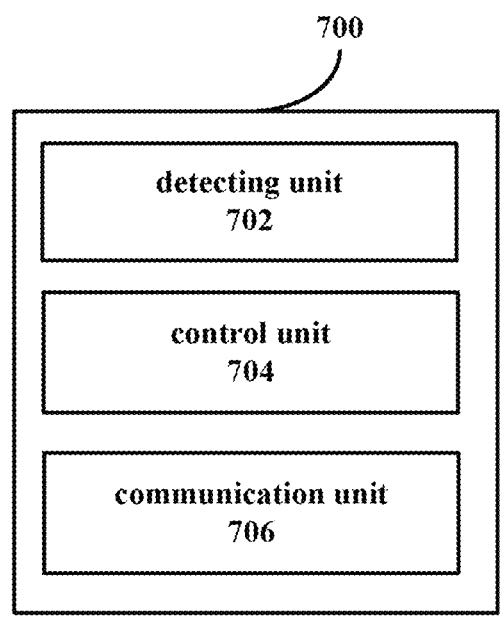
FIG. 7 is a block diagram illustrating an example of functional configuration of a device on a base station side in a wireless communication system according to another embodiment of the present disclosure.

Next, a self-carrier scheduling scheme for uplink transmission is described with reference to FIG. 7. FIG. 7 is a block diagram illustrating an example of functional configuration of a device on a base station side in a wireless communication system according to another embodiment of the present disclosure.

Referring to FIG. 7, a device 700 according to the embodiment may include a detecting unit 702, a control unit 704 and communication unit 706. The control unit 704 and the communication unit 706 have substantially the same functional configurations as those of the control unit 102 and the communication unit 104 described above in the case of the cross-carrier scheduling scheme for uplink transmission, which will not be repeated herein. Only the functional configuration of the detecting unit 702 is described in detail below.

The detecting unit 702 may be configured to detect availability of a specific secondary component carrier among the plurality of secondary component carriers. As described above, in the self-carrier scheduling scheme, since the eNB transmits the UL grant to the user equipment via a secondary component carrier, the eNB needs to perform, before transmitting the UL grant, energy detection on the specific secondary component carrier to determine whether the specific secondary component carrier is available, and the communication unit 706 transmits the UL grant to the user equipment over the specific secondary component carrier only if the detecting unit 702 detects that the specific secondary component carrier is available.

It is to be noted that different from the case of downlink transmission, in the cross-carrier scheduling scheme for uplink transmission, only the primary component carrier can be used to transmit the UL grant, and the UL grant for the specific secondary component carrier cannot be transmitted over other available secondary component carrier.

Figure 8:
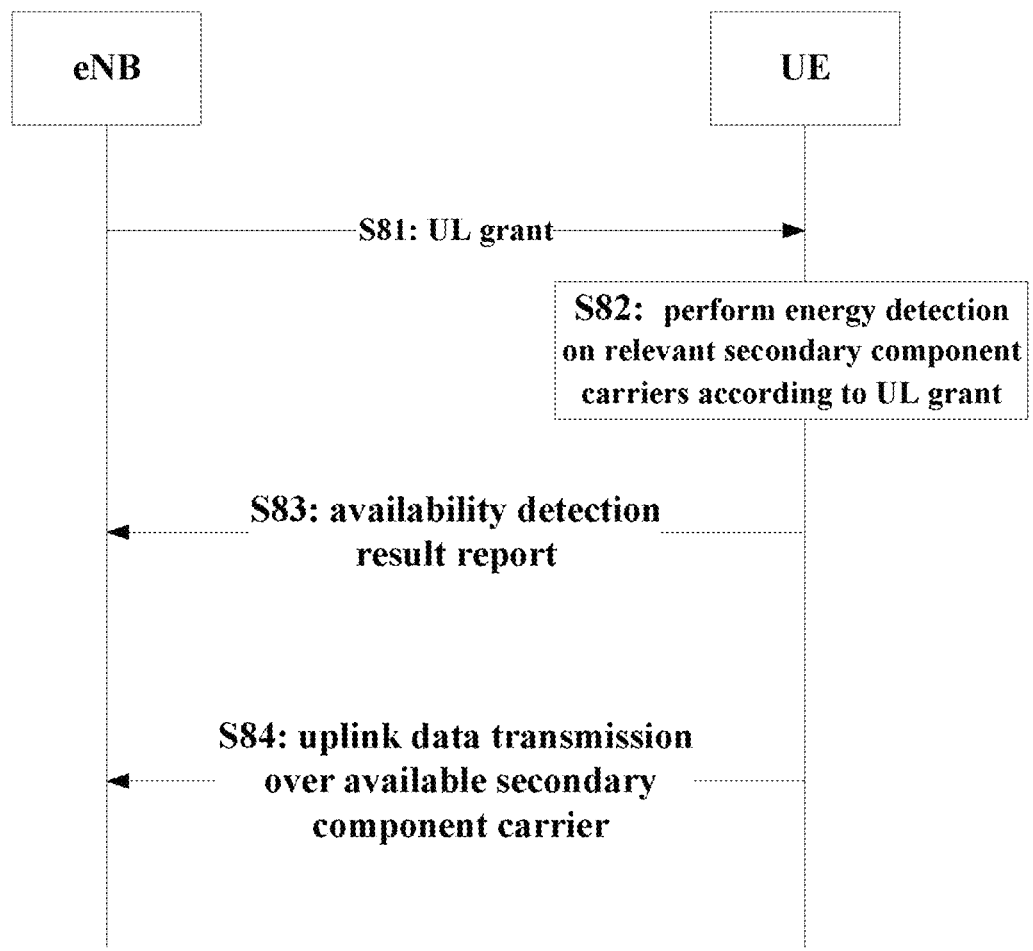
FIG. 8 is a flowchart illustrating a signaling interaction procedure of an implementation scheme of cross-carrier scheduling for uplink transmission according to an embodiment of the present disclosure.
Figure 9:
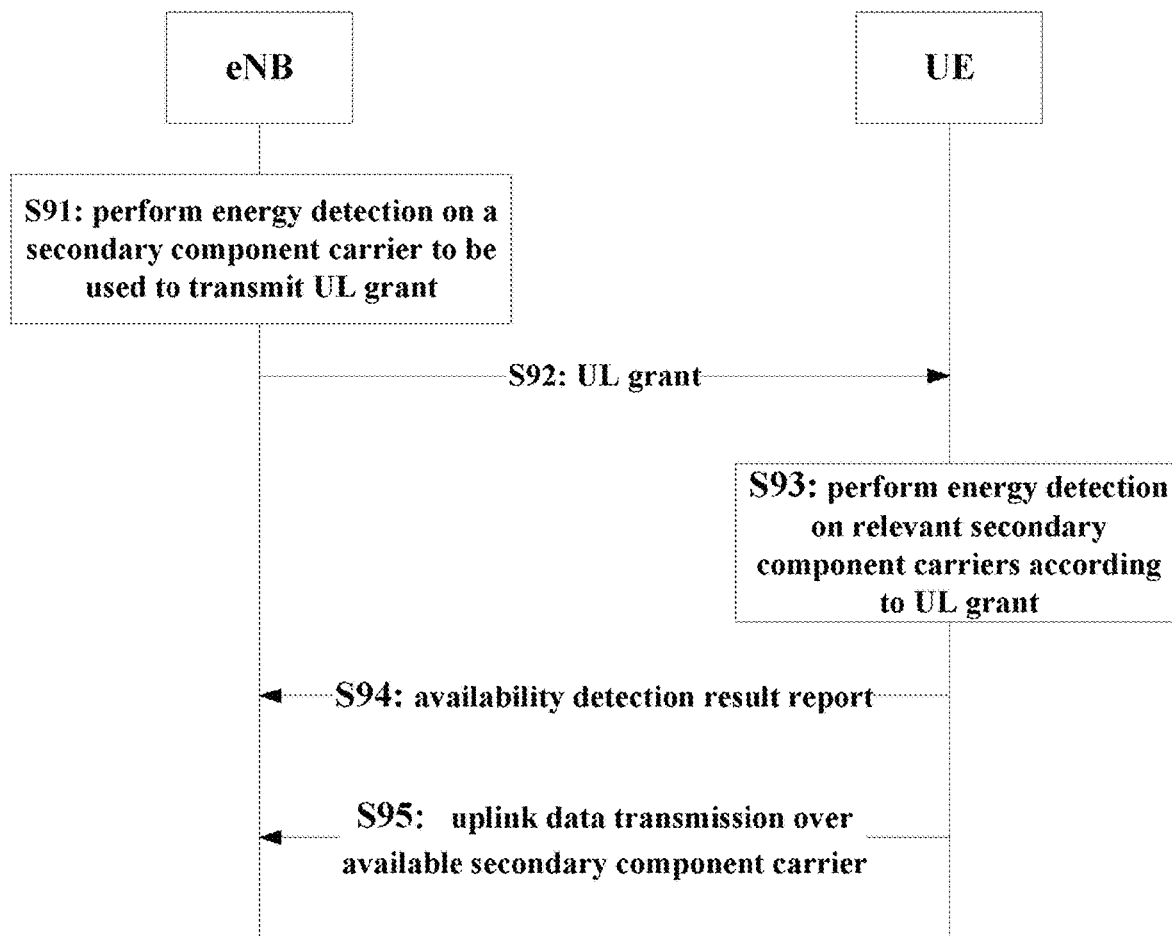
FIG. 9 is a flowchart illustrating a signaling interaction procedure of an implementation scheme of self-carrier scheduling for uplink transmission according to an embodiment of the present disclosure.

In order to better understand the power control scheme for the uplink transmission, the signaling interaction procedures of the cross-carrier scheduling scheme and the self-carrier scheduling scheme for uplink transmission are described with reference to FIG. 8 and FIG. 9 respectively. FIG. 8 is a flowchart illustrating a signaling interaction procedure of an implementation scheme of cross-carrier scheduling for uplink transmission according to an embodiment of the present disclosure, and FIG. 9 is a flowchart illustrating a signaling interaction procedure of an implementation scheme of self-carrier scheduling for uplink transmission according to an embodiment of the present disclosure.

Referring to FIG. 8, in step S81, the eNB sends the UL grant to the user equipment via the primary component carrier. Next, in step S82, the user equipment performs the energy detection on the secondary component carrier according to the received UL grant to determine whether the secondary component carrier is available. Then in step S83, the user equipment directly reports the detection result to the eNB through a physical uplink control channel (PUCCH), or reports the detection result multiplexed with uplink data to the eNB through a physical uplink shared channel (PUSCH). Then, in step S84, the user equipment performs uplink data transmission to the eNB over the available secondary component carrier.

It is to be noted that, FIG. 8 only shows the signaling interaction procedure in one transmission cycle, thus the operations that the eNB performs the power adjustment according to the received detection result in the above manner and notifies the user equipment of the power adjustment result via the UL grant in the next cycle are not illustrated herein, but these operations can be understood by those skilled in the art according to the above description.

Next, the signaling interaction procedure of the implementation scheme of self-carrier scheduling for uplink transmission is described with reference to FIG. 9.

The signaling interaction procedure shown in FIG. 9 is substantially the same as that shown in FIG. 8, and only differs in that since the UL grant is sent to the user equipment via the secondary component carrier itself in the self-carrier scheduling scheme, in the flowchart in FIG. 9, the eNB should perform, before transmitting the UL grant to the user equipment, the energy detection on the specific secondary component carrier to determine whether the specific secondary component carrier is available, and transmits the UL grant to the user equipment via the secondary component carrier only if the secondary component carrier is available. The processing in other steps may be referred to the foregoing description of the corresponding steps in FIG. 8 and is not repeated herein.

Also, it is to be understood that the signaling interaction procedures shown in FIG. 8 and FIG. 9 are only exemplary, and those skilled in the art can modify the procedures according to the principle in the present disclosure, and all of such modifications fall in the scope of the present disclosure.

Figure 10:
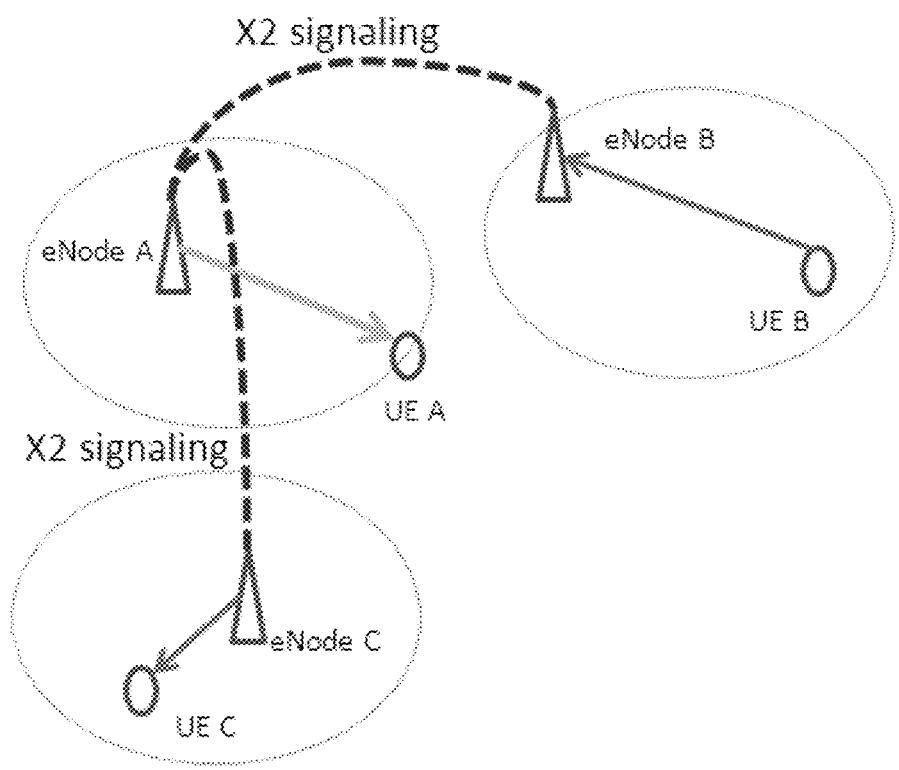
FIG. 10 is a schematic diagram illustrating an example of information interaction among base stations according to an embodiment of the present disclosure.

Referring back to FIG. 1, preferably, the communication unit 104 may be further configured to interact, via X2 signaling, the availability detection result and the power adjustment result of each of the secondary component carriers with a neighboring base station. The control unit 102 may be further configured to select, according to a result of the interaction, including the availability detection result and the power adjustment result of the secondary component carriers from other base stations, the secondary component carrier(s) to be used from the plurality of secondary component carriers, and/or to activate/deactivate the plurality of secondary component carriers. FIG. 10 is a schematic diagram illustrating an example of information interaction among base stations according to an embodiment of the present disclosure.

In the example as shown in FIG. 10, the neighboring base stations may exchange, via an X2 interface, their respective availability detection results and power adjustment results of the secondary component carriers with each other.

It is to be understood that, the interaction of the availability detection result and power adjustment result for the secondary component carriers among the base stations may facilitate coordination on the whole unlicensed band, including for example carrier selection, frequency multiplexing, and activation/deactivation of each of the secondary component carriers, performed by the base station. For example, in order to achieve more efficient frequency multiplexing on a particular carrier, inter-base station interference should be maintained at a certain level, thus the base station may preferentially select, according to the power adjustment result for each of the secondary component carriers, a secondary component carrier with a relatively low transmission power, especially for a base station having relatively great uplink transmission traffic. As another example, according to the availability detection result for each of the secondary component carriers, the base station may preferentially select the secondary component carrier having a high success rate in energy detection. If energy detection on a particular secondary component carrier performed by a base station is failed, other base stations may deactivate the secondary component carrier according to the detection result, and activate other secondary component carriers for which the energy detection is successful. This is especially advantageous for a case of aggregation among more and more carriers (for example, up to 32 carriers) in the future.

It can be seen that, the interaction among the base stations can optimize the performance of the wireless communication system.

Figure 11:
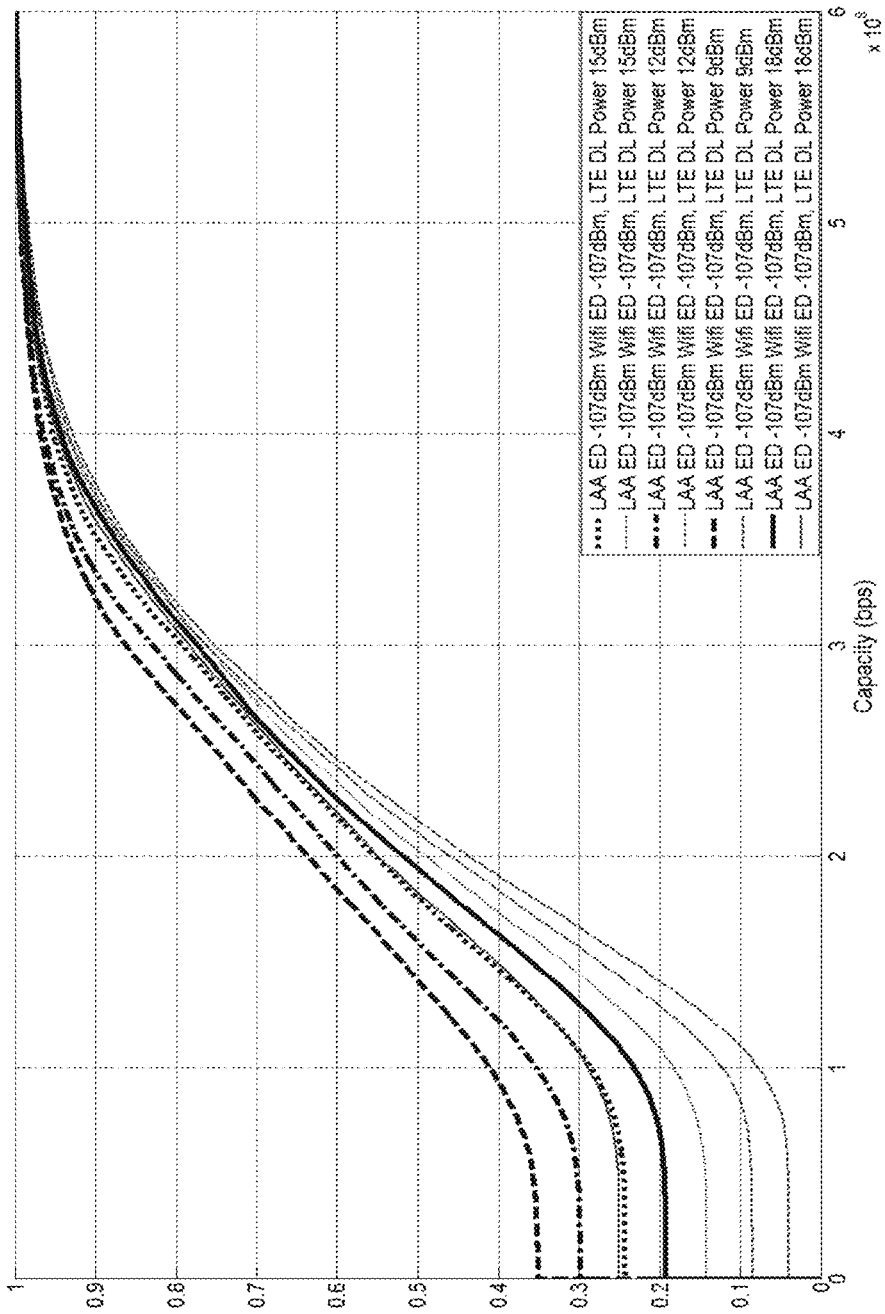
FIG. 11 is a schematic diagram illustrating a simulation result of system performance obtained by applying the technology according to the present disclosure.

FIG. 11 is a schematic diagram illustrating a simulation result of system performance obtained by applying the technology according to the present disclosure.

It can be seen from FIG. 11 that, with the same energy detection threshold value, the system performance can be significantly improved by performing dynamic power adjustment based on the energy detection result (i.e., the availability detection result) for the secondary component carriers.

Corresponding to the device on the base station side, an example of functional configuration of a device of on a user equipment side is described below with reference to FIG. 12 and FIG. 13.

Figure 12:
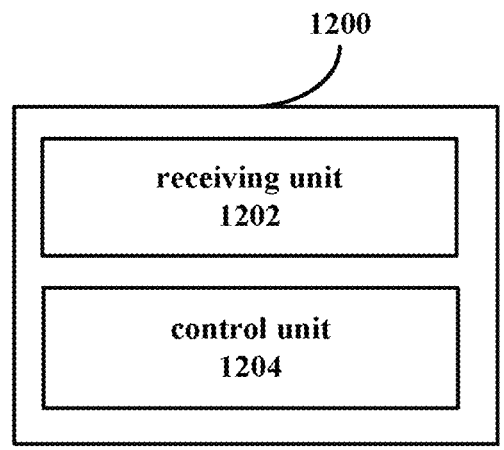
FIG. 12 is a block diagram illustrating an example of functional configuration of a device on a user equipment side in a wireless communication system according to an embodiment of the present disclosure.

FIG. 12 is a block diagram illustrating an example of functional configuration of a device on a user equipment side in a wireless communication system according to an embodiment of the present disclosure.

Referring to FIG. 12, a device 1200 according to the embodiment may include a receiving unit 1202 and a control unit 1204.

The receiving unit 1202 may be configured to receive a power adjustment result from a base station. The power adjustment result is obtained by performing, by the base station, power adjustment according to an availability detection result for a plurality of secondary component carriers on an unlicensed band, so that predetermined transmission power pre-allocated to one or more unavailable secondary component carriers is allocated to a secondary component carrier to be used among available secondary component carriers. The power adjustment result includes at least information indicating whether power allocation is changed. Preferably, the power adjustment result further includes information indicating an offset amount of the power adjustment.

The control unit 1204 may be configured to perform a corresponding operation according to the power adjustment result.

In the case of downlink transmission, the receiving unit 1202 is further configured to receive power control information including the power adjustment result from the base station, and the control unit 1204 is further configured to obtain the power adjustment result by decoding the power control information so as to control a channel status information measurement result and/or a radio resource management measurement result.

In the case of downlink transmission, the availability detection on the secondary component carriers on the unlicensed band is performed by the base station, and the user equipment may accordingly adjust its CSI measurement result and/or RRM measurement result (including RSRP and/or RSRQ) according to the received power adjustment result, including at least information indicating whether power allocation is changed and optionally including the offset amount of the power adjustment. This is because the CSI measurement result and/or RRM measurement result is relevant to the transmission power over the channel, and the user equipment should adjust the CSI measurement result and/or RRM measurement result based on the power adjustment result, for example, subtract the added offset amount of the power adjustment. Otherwise, inaccurate CSI measurement result and RRM measurement result of the user equipment may affect the accuracy of channel estimation, which in turn affects the subsequent operations such as resource scheduling, link adaptation (such as modulation coding scheme selection), cell configuration, mobility management (cell handover, cell selection), secondary cell activation and de-activation, load transfer or the like.

Preferably, in the case of the above first scheme, the control unit 1204 may obtain the power adjustment result by decoding the power control information (i.e., the DCI format 1A/1B/1D/1/2A/2/2B/2C/2D) for each of the plurality of secondary component carriers. In this case, the TPC command (i.e., the information bits for transmission power control of PUCCH) or padding bits (2 bits) in the DCI format 1A/1B/1D/1/2A/2/2B/2C/2D is reused to indicate the power adjustment result. Alternatively, in the case of the above second scheme, the control unit 1204 may obtain the power adjustment result by decoding the power control information (i.e., the DCI format 1C) common to the plurality of secondary component carriers. In this case, the information bits for TDD configuration or padding bits (3 bits per secondary component carrier) in the DCI format 1C are reused to indicate the power adjustment result. Alternatively, in the case of the above third scheme, the control unit 1204 may obtain the power adjustment result by jointly decoding the DCI format 1C and the DCI format 1A/1B/1D/1/2A/2/2B/2C/2D (i.e., the DL grant).

The example of the functional configuration of the device on the user equipment side for the downlink transmission has been described above. Next, an example of functional configuration of a device on a user equipment side for uplink transmission is described below with reference to FIG. 13. FIG. 13 is a block diagram illustrating an example of functional configuration of a device on a user equipment side in a wireless communication system according to another embodiment of the present disclosure.

Figure 13:
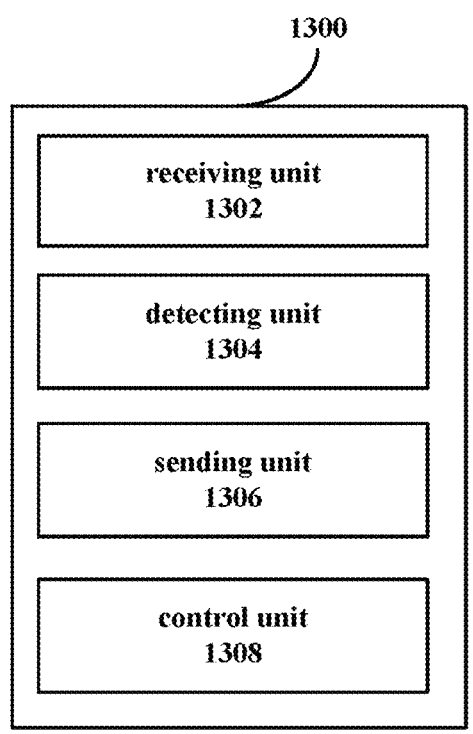
FIG. 13 is a block diagram illustrating an example of functional configuration of a device on a user equipment side in a wireless communication system according to another embodiment of the present disclosure.

Referring to FIG. 13, a device 1300 according to the embodiment may include a receiving unit 1302, a detecting unit 1304, a sending unit 1306 and a control unit 1308. The receiving unit 1302 and the control unit 1308 have substantially the same functional configurations as those of the receiving unit 1202 and the control unit 1204 described above, which will not be repeated herein. Only examples of the functional configurations of the detecting unit 1304 and the sending unit 1306 are described in detail below.

In the case of uplink transmission, the receiving unit 1302 is further configured to receive uplink scheduling grant signaling (i.e., the UL grant) for the plurality of secondary component carriers from the base station, and the detecting unit 1304 may be configured to detect availability of the plurality of secondary component carriers according to the received uplink scheduling grant signaling. As described above, before performing the uplink data transmission, the user equipment should perform the energy detection on the secondary component carrier to determine whether the secondary component carrier is available.

The sending unit 1306 may be configured to send the detection result to the base station for the base station to control the uplink transmission power, for example, to increase the number of the resource blocks to be used for the transmission block transmitted by the available secondary component carrier or to adjust the modulation coding scheme thereof. The base station includes the power adjustment result in the UL grant for controlling the power of the uplink data transmission in the next cycle. Preferably, the sending unit 1306 may directly send the availability detection result for the secondary component carrier through PUCCH or send the availability detection result for the secondary component carrier multiplexed with uplink data through PUSCH.

Next, in a case that the detecting unit 1304 detects a specific secondary component carrier is available, the sending unit 1306 may perform uplink data transmission to the base station over the specific secondary component carrier, and performs, according to the power adjustment result, uplink data transmission to the base station over the specific secondary component carrier with the transmission power in the next cycle.

It is to be understood that, the device on the user equipment side described with reference to FIG. 12 and FIG. 13 corresponds to the device on the base station side described above, and thus contents which are not specifically described herein may be referred to the corresponding description in the embodiments of the device on the base station side, and are not repeated herein.

In addition, it is to be understood that although the examples of the functional configurations of the devices on the base station side and the user equipment side in the wireless communication system and examples of corresponding signaling interaction procedures according to the embodiment of the present disclosure have been described above, these are merely examples rather than limitations, and those skilled in the art may modify the above embodiments according to the principle in the present disclosure. For example, the functional modules in the embodiments may be added, deleted and/or combined, or the like, and all of such modifications fall within the scope of the present disclosure.

Method embodiments corresponding to the above device embodiments are further provided in the present disclosure. Methods in a wireless communication system according to an embodiment of the present disclosure are described with reference to FIG. 14 and FIG. 15.

Figure 14:
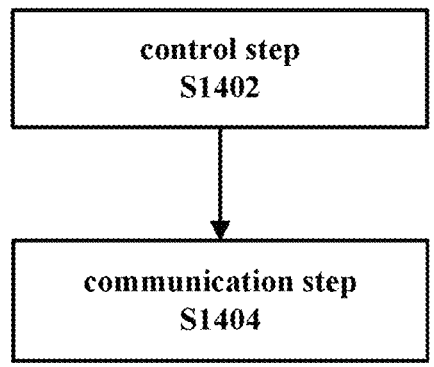
FIG. 14 is a flowchart illustrating a process example of a method on a base station side in a wireless communication system according to an embodiment of the present disclosure.

Firstly, a method on a base station side in a wireless communication system according to an embodiment of the present disclosure is described with reference to FIG. 14. FIG. 14 is a flowchart illustrating a process example of a method on a base station side in a wireless communication system according to an embodiment of the present disclosure.

Referring to FIG. 14, the method according to the embodiment may include a control step S1402 and a communication step S1404.

In the control step S1402, power adjustment may be performed according to an availability detection result for a plurality of secondary component carriers on an unlicensed band, so that predetermined transmission power pre-allocated to one or more unavailable secondary component carriers is allocated to a secondary component carrier to be used among available secondary component carriers.

Next, in the communication step S1404, a power adjustment result may be sent to a user equipment, the power adjustment result including at least information indicating whether power allocation is changed.

Preferably, the power adjustment result may further include information indicating an offset amount of the power adjustment.

Preferably, in the communication step, the availability detection result and the corresponding power adjustment result for each of the secondary component carriers may be interacted with a neighboring base station via X2 signaling.

Preferably, in the control step, the secondary component carrier to be used may be selected from the plurality of secondary component carriers according to a result of the interaction.

Preferably, in the control step, the plurality of secondary component carriers may be activated/deactivated according to a result of the interaction.

Preferably, the method may further include a detecting step and a power control information generating step. In the detecting step, availability of the plurality of secondary component carriers may be detected to determine the unavailable secondary component carriers and the available secondary component carriers. In the power control information generating step, power control information including the power adjustment result may be generated. In the control step, the power adjustment may be performed according to a detection result. In the communication step, the power control information may be sent to the user equipment, and downlink signal transmission to the user equipment is performed according to the power adjustment result.

Preferably, in the power control information generating step, the power control information may be generated for each of the plurality of secondary component carriers, and the power control information may be preferably DCI format 1A/1B/1D/1/2A/2/2B/2C/2D. Preferably, the power control information may reuse information bits for transmission power control of Physical Uplink Control Channel (PUCCH) or padding bits in the DCI format 1A/1B/1D/1/2A/2/2B/2C/2D to notify the power adjustment result to the user equipment.

Alternatively and preferably, in the power control information generating step, the power control information common to the plurality of secondary component carriers may be generated. The power control information may be DCI format 1C. Preferably, the power control information may reuse information bits for uplink/downlink configuration of TDD or padding bits in the DCI format 1C to notify the power adjustment result to the user equipment.

Preferably, the power control information may be MAC layer control information or RRC layer control information.

Preferably, in the communication step, the DL grant may be transmitted to the user equipment through a primary component carrier or an available secondary component carrier, to achieve cross-carrier scheduling or self-carrier scheduling.

Preferably, in the communication step, uplink scheduling grant signaling for the plurality of secondary component carriers may be sent to the user equipment, and the availability detection result for the plurality of secondary component carriers reported by the user equipment according to the uplink scheduling grant signaling may be received. Further, in the control step, the power adjustment may be performed according to the availability detection result from the user equipment, and in the next cycle, the uplink scheduling grant signaling including the power adjustment result is sent to the user equipment in the communication step.

Preferably, the method may further include a detecting step of detecting availability of a specific secondary component carrier among the plurality of secondary component carriers, and in the communication step, the uplink scheduling grant signaling may be sent to the user equipment over the specific secondary component carrier if the specific secondary component carrier is detected to be available.

Preferably, in the communication step, the uplink scheduling grant signaling may be sent to the user equipment over the primary component carrier.

Preferably, in the control step, the power adjustment may be performed by allocating resource blocks to be used for transmission blocks transmitted by the one or more unavailable secondary component carriers to a transmission block transmitted by the secondary component carrier to be used among the available secondary component carriers or by adjusting a modulation coding scheme to be used for the transmission block transmitted by the secondary component carrier to be used among the available secondary component carriers.

Preferably, in the control step, a reason of uplink data transmission failure may be recognized according to the availability detection result from the user equipment, so as to adjust a size of a contention window of the plurality of secondary component carriers.

It is to be understood that contents which are not specifically described in the method embodiment may be referred to the corresponding description in the device embodiment on the base station side, and are not repeated herein.

Figure 15:
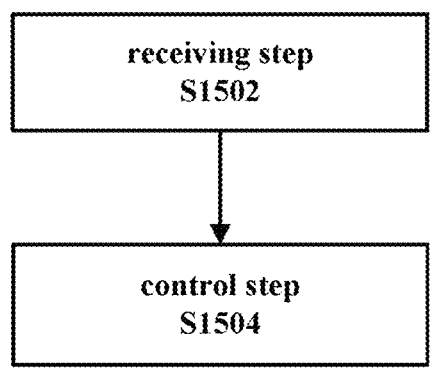
FIG. 15 is a flowchart illustrating a process example of a method on a user equipment side in a wireless communication system according to an embodiment of the present disclosure.

FIG. 15 is a flowchart illustrating a process example of a method on a user equipment side in a wireless communication system according to an embodiment of the present disclosure.

Referring to FIG. 15, the method according to the embodiment may include a receiving step S1502 and a control step S1504.

In the receiving step S1502, a power adjustment result may be received from a base station. The power adjustment result is obtained by performing, by the base station, power adjustment according to an availability detection result for a plurality of secondary component carriers on an unlicensed band, so that predetermined transmission power pre-allocated to one or more unavailable secondary component carriers is allocated to a secondary component carrier to be used among available secondary component carriers. The power adjustment result includes at least information indicating whether power allocation is changed. Preferably, the power adjustment result may further include information indicating an offset amount of the power adjustment.

In the control step S1504, a corresponding operation may be performed according to the power adjustment result.

Preferably, in the receiving step, power control information including the power adjustment result may be further received from the base station, and in the control step, the power adjustment result may be obtained by decoding the power control information to control a channel status information measurement result and/or a radio resource management measurement result.

Preferably, in the control step, the power adjustment result may be obtained by decoding the power control information for each of the plurality of secondary component carriers. Further preferably, in the control step, the power adjustment result may be obtained by decoding the DCI format 1A/1B/1D/1/2A/2/2B/2C/2D. Further preferably, in the control step, the power adjustment result may be obtained by decoding information bits for transmission power control of physical uplink control channel (PUCCH) or padding bits in the DCI format 1A/1B/1D/1/2A/2/2B/2C/2D.

Preferably, in the control step, the power adjustment result may be obtained by decoding the power control information common to the plurality of secondary component carriers. Further preferably, in the control step, the power adjustment result may be obtained by decoding the DCI format 1C. Further preferably, in the control step, the power adjustment result may be obtained by decoding information bits for uplink/downlink configuration of TDD or padding bits in the DCI format 1C.

Preferably, in the receiving step, uplink scheduling grant signaling for the plurality of secondary component carriers from the base station is further received. The method further includes a detection step of detecting availability of the plurality of secondary component carriers according to the uplink scheduling grant signaling and a sending step of sending a detection result to the base station. The power adjustment result is made by the base station according to the detection result.

Preferably, in the sending step, the detection result is sent directly through a physical uplink control channel (PUCCH), or the detection result multiplexed with uplink data is sent through a physical uplink shared channel (PUSCH).

Preferably, in the sending step, if the detection result indicates that a specific secondary component carrier is available, uplink data transmission to the base station may be performed over the specific secondary component carrier according to the power adjustment result included in the uplink scheduling grant signaling in the next cycle.

It is to be understood that contents which are not specifically described in the method embodiment may be referred to the corresponding description in the device embodiment on the user equipment side, and are not repeated herein.

It is to be noted that although the examples of the processes of the methods in the wireless communication system according to the embodiment of the present disclosure have been described, these are only examples rather than limitations. Those skilled in the art may modify the above embodiments according to the principle in the present disclosure. For example, the steps in the embodiments may be added, deleted and/or combined, or the like, and all of such modifications fall within the scope of the present disclosure.

In addition, according to an embodiment of the present disclosure, an electronic device is further provided, which includes a transceiver and one or more processors. The one or more processors may be configured to perform the methods or functions of the units in the wireless communication system according to the embodiments of the present disclosure.

It is to be understood that the machine-executable instructions in a storage medium and a program product according to an embodiment of the present disclosure may be configured to perform a method corresponding to the above device embodiment, and thus the contents which are not described in detail herein may be referred to the foregoing description at corresponding positions and are not repeated herein.

Accordingly, a storage medium on which the above program product storing machine-executable instructions is carried is also included in the present disclosure. The storage medium includes but not limited to a floppy disk, an optical disk, a magneto-optical disk, a storage card, a memory rod and the like.

Figure 16:
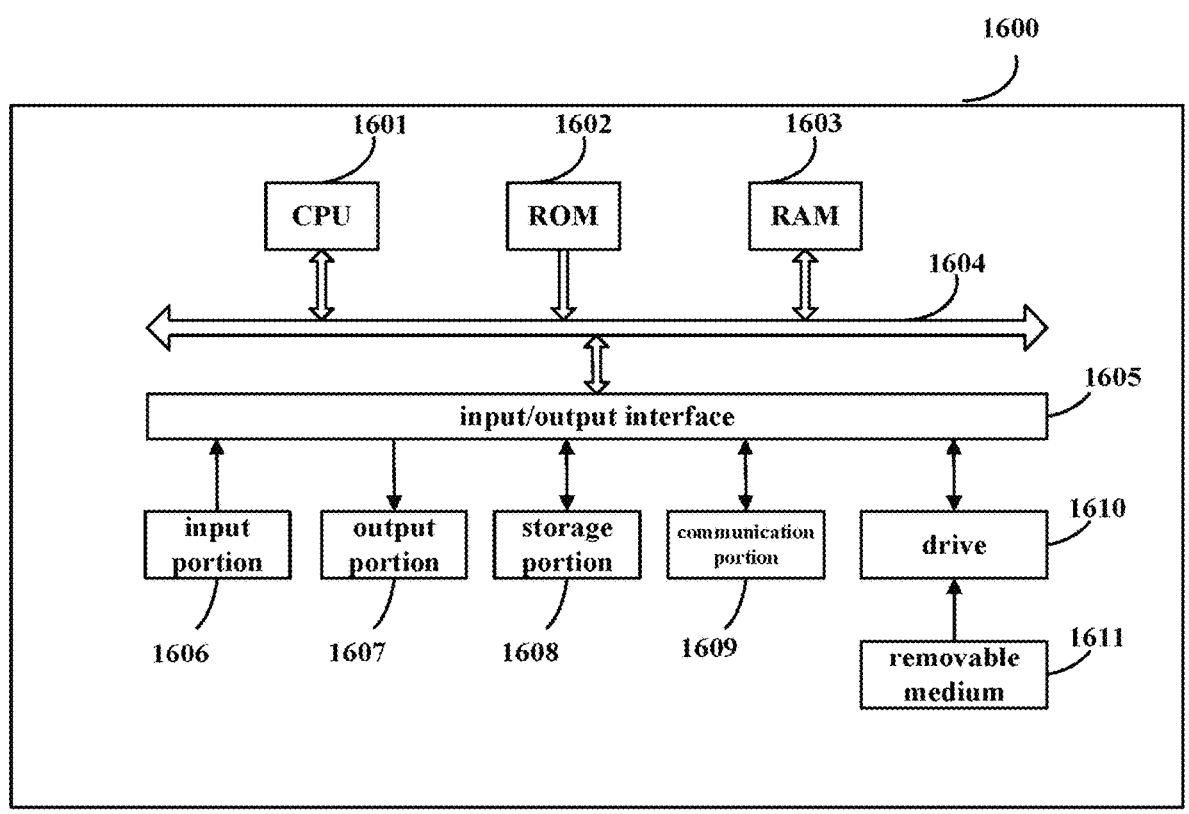
FIG. 16 is a block diagram illustrating an exemplary structure of a personal computer used as an information processing device according to an embodiment of the present disclosure.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1600 illustrated in FIG. 16, which can perform various functions when various programs are installed thereon. FIG. 16 is a block diagram illustrating an exemplary structure of a personal computer used as an information processing device according to an embodiment of the present disclosure.

In FIG. 16, a Central Processing Unit (CPU) 1601 performs various processes according to a program stored in a Read Only Memory (ROM) 1602 or loaded from a storage portion 1608 into a Random Access Memory (RAM) 1603 in which data required when the CPU 1601 performs the various processes is also stored as needed.

The CPU 1601, the ROM 1602 and the RAM 1603 are connected to each other via a bus 1604 to which an input/output interface 1605 is also connected.

The following components are connected to the input/output interface 1605: an input portion 1606 including a keyboard, a mouse, etc.; an output portion 1607 including a display, e.g., a Cathode Ray Tube (CRT), a Liquid Crystal Display (LCD), etc., a speaker, etc.; a storage portion 1608 including a hard disk, etc.; and a communication portion 1609 including a network interface card, e.g., an LAN card, a modem, etc. The communication portion 1609 performs a communication process over a network, e.g., the Internet.

A drive 1610 is also connected to the input/output interface 1605 as needed. A removable medium 1611, e.g., a magnetic disk, an optical disk, an magneto optical disk, a semiconductor memory, etc., can be installed on the drive 1610 as needed so that a computer program fetched therefrom can be installed into the storage portion 1608 as needed.

In the case that the foregoing series of processes are performed in software, a program constituting the software is installed from a network, e.g., the Internet, etc., or a storage medium, e.g., the removable medium 1611, etc.

Those skilled in the art shall appreciate that such a storage medium will not be limited to the removable medium 1611 illustrated in FIG. 16 in which the program is stored and which is distributed separately from the apparatus to provide a user with the program. Examples of the removable medium 1611 include a magnetic disk (including a Floppy Disk®), an optical disk (including Compact Disk-Read Only memory (CD-ROM) and a Digital Versatile Disk (DVD)), a magneto optical disk (including a Mini Disk (MD)®) and a semiconductor memory. Alternatively the storage medium can be the ROM 1602, a hard disk included in the storage portion 1608, etc., in which the program is stored and which is distributed together with the apparatus including the same to the user.

Application examples according to the present disclosure are described with reference to FIG. 17 to FIG. 20 below.

Application Example Regarding Base Station

First Application Example

Figure 17:
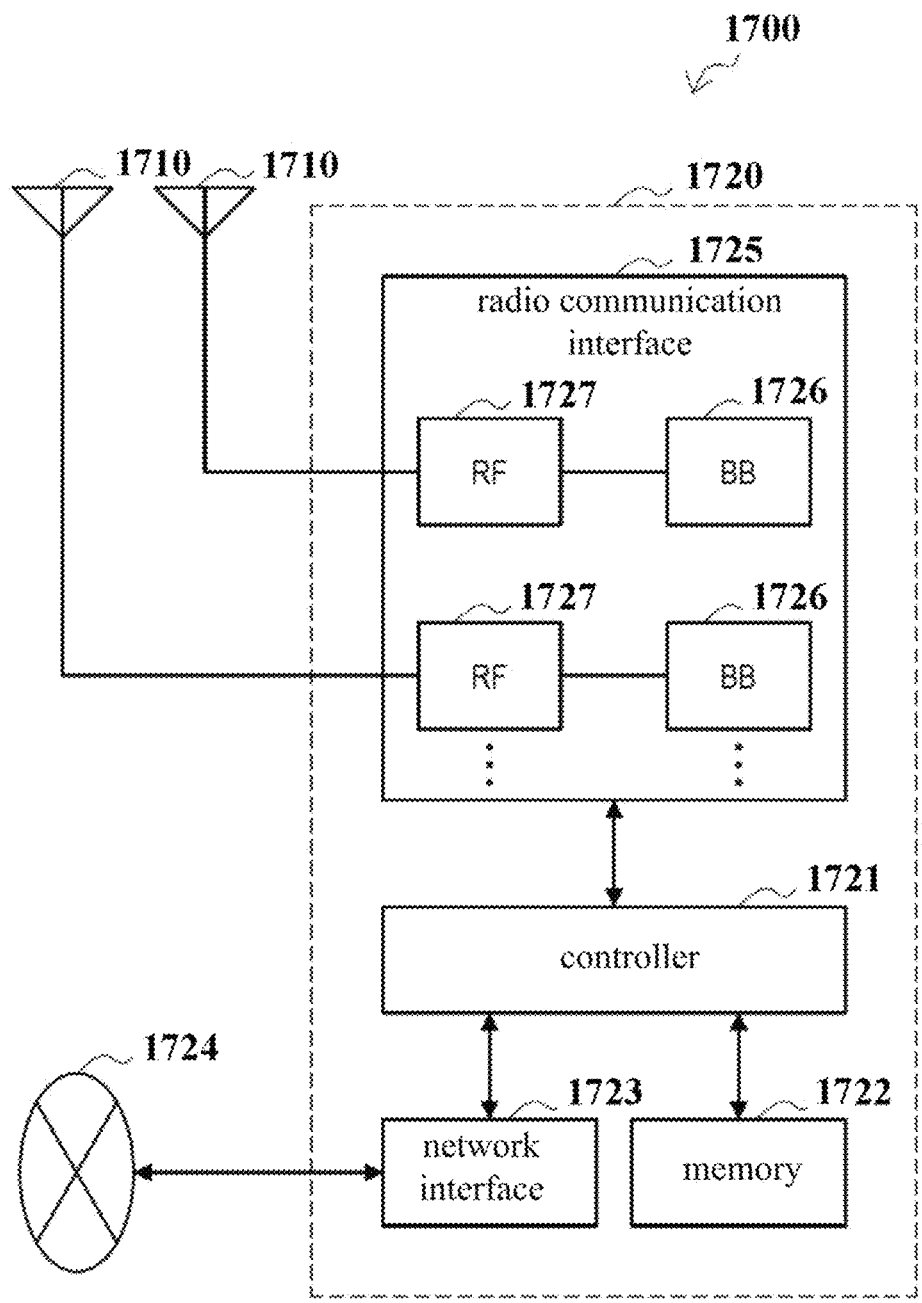
FIG. 17 is a block diagram illustrating a first example of a schematic configuration of an evolved Node B (eNB) to which the technology of the present disclosure may be applied.

FIG. 17 is a block diagram illustrating a first example of a schematic configuration of an eNB to which the technology of the present disclosure may be applied. An eNB 1700 includes one or more antennas 1710 and a base station apparatus 1720. Each antenna 1710 and the base station apparatus 1720 may be connected to each other via an RF cable.

Each of the antennas 1710 includes a single or multiple antenna elements (such as multiple antenna elements included in an MIMO antenna), and is used for the base station apparatus 1720 to transmit and receive radio signals. The eNB 1700 may include the multiple antennas 1710, as illustrated in FIG. 17. For example, the multiple antennas 1710 may be compatible with multiple frequency bands used by the eNB 1700. Although FIG. 17 illustrates the example in which the eNB 1700 includes the multiple antennas 1710, the eNB 1700 may also include a single antenna 1710.

The base station apparatus 1720 includes a controller 1721, a memory 1722, a network interface 1723, and a radio communication interface 1725.

The controller 1721 may be, for example, a CPU or a DSP, and operates various functions of a higher layer of the base station apparatus 1720. For example, the controller 1721 generates a data packet from data in signals processed by the radio communication interface 1725, and transfers the generated packet via the network interface 1723. The controller 1721 may bundle data from multiple base band processors to generate the bundled packet, and transfer the generated bundled packet. The controller 1721 may have logical functions of performing control such as radio resource control, radio bearer control, mobility management, admission control, and scheduling. The control may be performed in corporation with an eNB or a core network node in the vicinity. The memory 1722 includes RAM and ROM, and stores a program that is executed by the controller 1721, and various types of control data (such as a terminal list, transmission power data, and scheduling data).

The network interface 1723 is a communication interface for connecting the base station apparatus 1720 to a core network 1724. The controller 1721 may communicate with a core network node or another eNB via the network interface 1723. In that case, the eNB 1700, and the core network node or the other eNB may be connected to each other through a logical interface (such as an S1 interface and an X2 interface). The network interface 1723 may also be a wired communication interface or a radio communication interface for radio backhaul. If the network interface 1723 is a radio communication interface, the network interface 1723 may use a higher frequency band for radio communication than a frequency band used by the radio communication interface 1725.

The radio communication interface 1725 supports any cellular communication scheme (such as Long Term Evolution (LTE) and LTE-Advanced), and provides radio connection to a terminal positioned in a cell of the eNB 1700 via the antenna 1710. The radio communication interface 1725 may typically include, for example, a baseband (BB) processor 1726 and an RF circuit 1727. The BB processor 1726 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1726 may have a part or all of the above-described logical functions instead of the controller 1721. The BB processor 1726 may be a memory that stores a communication control program, or a module that includes a processor and a related circuit configured to execute the program. Updating the program may allow the functions of the BB processor 1726 to be changed. The module may be a card or a blade that is inserted into a slot of the base station apparatus 1720. Alternatively, the module may also be a chip that is mounted on the card or the blade. Meanwhile, the RF circuit 1727 may include, for example, a mixer, a filter, and an amplifier, and transmits and receives radio signals via the antenna 1710.

The radio communication interface 1725 may include the multiple BB processors 1726, as illustrated in FIG. 17. For example, the multiple BB processors 1726 may be compatible with multiple frequency bands used by the eNB 1700. The radio communication interface 1725 may include the multiple RF circuits 1727, as illustrated in FIG. 17. For example, the multiple RF circuits 1727 may be compatible with multiple antenna elements. Although FIG. 17 illustrates the example in which the radio communication interface 1725 includes the multiple BB processors 1726 and the multiple RF circuits 1727, the radio communication interface 1725 may also include a single BB processor 1726 or a single RF circuit 1727.

Second Application Example

Figure 18:
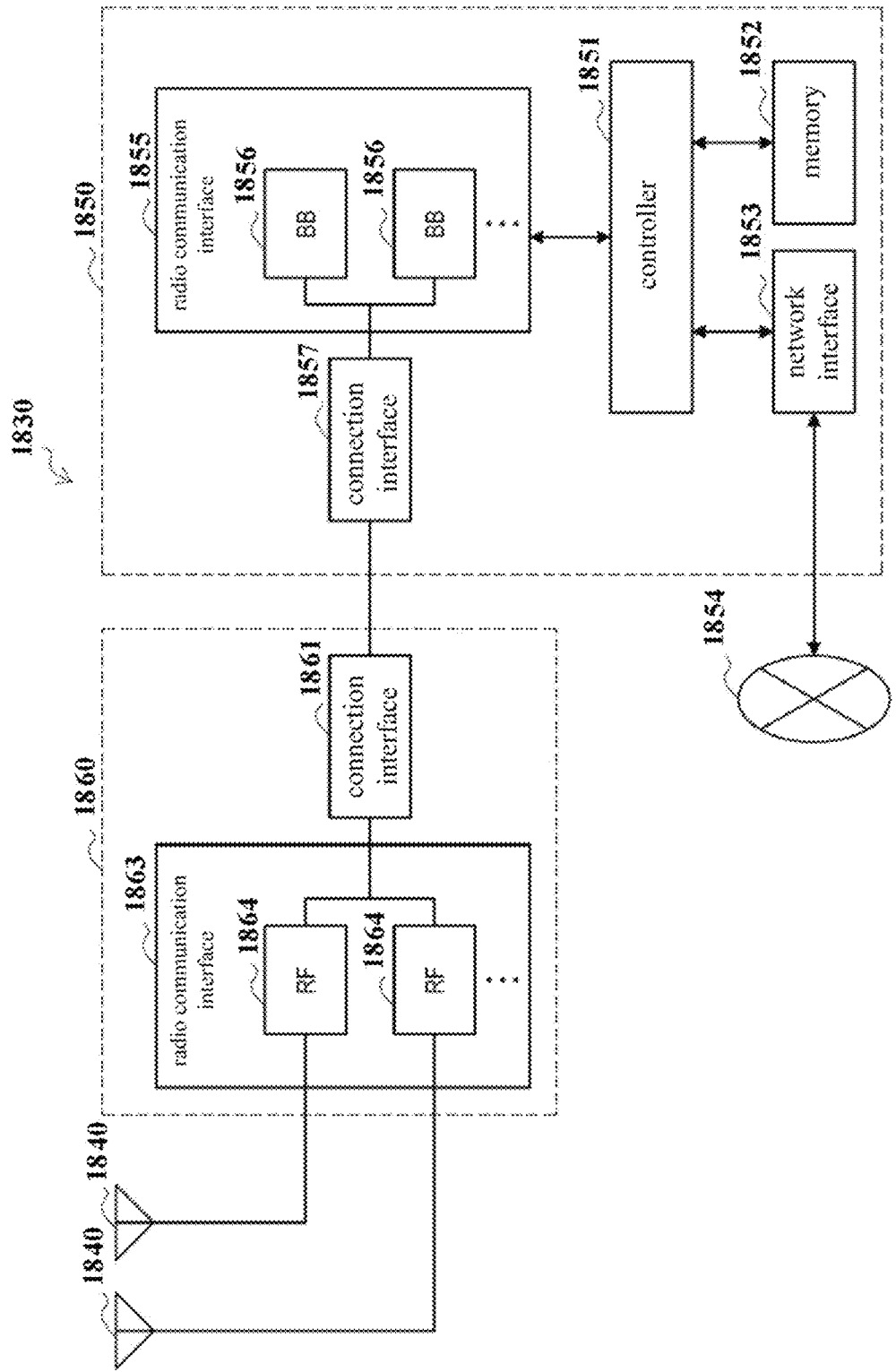
FIG. 18 is a block diagram illustrating a second example of a schematic configuration of an eNB to which the technology according to the present disclosure may be applied.

FIG. 18 is a block diagram illustrating a second example of a schematic configuration of an eNB to which the technology of the present disclosure may be applied. An eNB 1830 includes one or more antennas 1840, a base station apparatus 1850, and an RRH 1860. Each antenna 1840 and the RRH 1860 may be connected to each other via an RF cable. The base station apparatus 1850 and the RRH 1860 may be connected to each other via a high speed line such as an optical fiber cable.

Each of the antennas 1840 includes a single or multiple antenna elements (such as multiple antenna elements included in an MIMO antenna), and is used for the RRH 1860 to transmit and receive radio signals. The eNB 1830 may include the multiple antennas 1840, as illustrated in FIG. 18. For example, the multiple antennas 1840 may be compatible with multiple frequency bands used by the eNB 1830. Although FIG. 18 illustrates the example in which the eNB 1830 includes the multiple antennas 1840, the eNB 1830 may also include a single antenna 1840.

The base station apparatus 1850 includes a controller 1851, a memory 1852, a network interface 1853, a radio communication interface 1855, and a connection interface 1857. The controller 1851, the memory 1852, and the network interface 1853 are the same as the controller 1721, the memory 1722, and the network interface 1723 described with reference to FIG. 17.

The radio communication interface 1855 supports any cellular communication scheme (such as LTE and LTE-Advanced), and provides radio communication to a terminal positioned in a sector corresponding to the RRH 1860 via the RRH 1860 and the antenna 1840. The radio communication interface 1855 may typically include, for example, a BB processor 1856. The BB processor 1856 is the same as the BB processor 1726 described with reference to FIG. 17, except the BB processor 1856 is connected to the RF circuit 1864 of the RRH 1860 via the connection interface 1857. The radio communication interface 1855 may include the multiple BB processors 1856, as illustrated in FIG. 18. For example, the multiple BB processors 1856 may be compatible with multiple frequency bands used by the eNB 1830. Although FIG. 18 illustrates the example in which the radio communication interface 1855 includes the multiple BB processors 1856, the radio communication interface 1855 may also include a single BB processor 1856.

The connection interface 1857 is an interface for connecting the base station apparatus 1850 (radio communication interface 1855) to the RRH 1860. The connection interface 1857 may also be a communication module for communication in the above-described high speed line that connects the base station apparatus 1850 (radio communication interface 1855) to the RRH 1860.

The RRH 1860 includes a connection interface 1861 and a radio communication interface 1863.

The connection interface 1861 is an interface for connecting the RRH 1860 (radio communication interface 1863) to the base station apparatus 1850. The connection interface 1861 may also be a communication module for communication in the above-described high speed line.

The radio communication interface 1863 transmits and receives radio signals via the antenna 1840. The radio communication interface 1863 may typically include, for example, the RF circuit 1864. The RF circuit 1864 may include, for example, a mixer, a filter, and an amplifier, and transmits and receives radio signals via the antenna 1840. The radio communication interface 1863 may include multiple RF circuits 1864, as illustrated in FIG. 18. For example, the multiple RF circuits 1864 may support multiple antenna elements. Although FIG. 18 illustrates the example in which the radio communication interface 1863 includes the multiple RF circuits 1864, the radio communication interface 1863 may also include a single RF circuit 1864.

In the eNB 1700 and eNB 1830 shown in FIG. 17 and FIG. 18, the communication unit described with reference to FIGS. 1, 2 and 7 may be implemented by the radio communication interface 1725 and the radio communication interface 1855 and/or the radio communication interface 1863. At least a part of the functions of the control unit, the detecting unit and the power control information generating unit may be implemented by the controller 1721 and the controller 1851.

Application Example Regarding User Equipment

First Application Example

Figure 19:
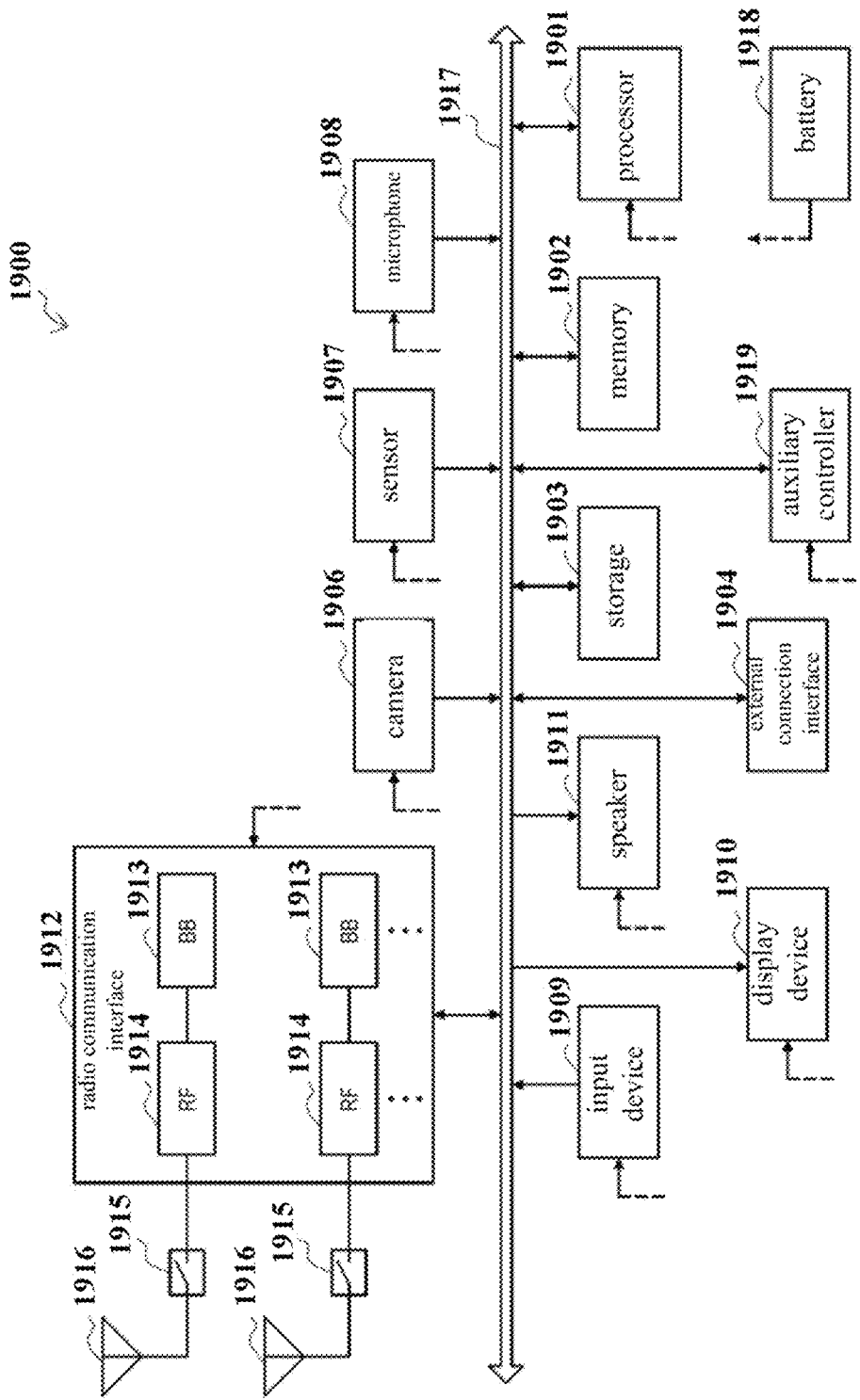
FIG. 19 is a block diagram illustrating an example of a schematic configuration of a smartphone to which the technology according to the present disclosure may be applied.

FIG. 19 is a block diagram illustrating an example of a schematic configuration of a smartphone 1900 to which the technology of the present disclosure may be applied. The smartphone 1900 includes a processor 1901, a memory 1902, a storage 1903, an external connection interface 1904, a camera 1906, a sensor 1907, a microphone 1908, an input device 1909, a display device 1910, a speaker 1911, a radio communication interface 1912, one or more antenna switches 1915, one or more antennas 1916, a bus 1917, a battery 1918, and an auxiliary controller 1919.

The processor 1901 may be, for example, a CPU or a system on a chip (SoC), and controls functions of an application layer and another layer of the smartphone 1900. The memory 1902 includes RAM and ROM, and stores a program that is executed by the processor 1901, and data. The storage 1903 may include a storage medium such as a semiconductor memory and a hard disk. The external connection interface 1904 is an interface for connecting an external device (such as a memory card and a universal serial bus (USB) device) to the smartphone 1900.

The camera 1906 includes an image sensor (such as a charge coupled device (CCD) and a complementary metal oxide semiconductor (CMOS)), and generates a captured image. The sensor 1907 may include a group of sensors such as a measurement sensor, a gyro sensor, a geomagnetic sensor, and an acceleration sensor. The microphone 1908 converts sounds that are input to the smartphone 1900 to audio signals. The input device 1909 includes, for example, a touch sensor configured to detect touch onto a screen of the display device 1910, a keypad, a keyboard, a button, or a switch, and receives an operation or an information input from a user. The display device 1910 includes a screen (such as a liquid crystal display (LCD) and an organic light-emitting diode (OLED) display), and displays an output image of the smartphone 1900. The speaker 1911 converts audio signals that are output from the smartphone 1900 to sounds.

The radio communication interface 1912 supports any cellular communication scheme (such as LET and LTE-Advanced), and performs radio communication. The radio communication interface 1912 may typically include, for example, a BB processor 1913 and an RF circuit 1914. The BB processor 1913 may perform, for example, encoding/decoding, modulating/demodulating, and multiplexing/demultiplexing, and performs various types of signal processing for radio communication. Meanwhile, the RF circuit 1914 may include, for example, a mixer, a filter, and an amplifier, and transmits and receives radio signals via the antenna 1916. The radio communication interface 1912 may be a one chip module having the BB processor 1913 and the RF circuit 1914 integrated thereon. The radio communication interface 1912 may include the multiple BB processors 1913 and the multiple RF circuits 1914, as illustrated in FIG. 19. Although FIG. 19 illustrates the example in which the radio communication interface 1912 includes the multiple BB processors 1913 and the multiple RF circuits 1914, the radio communication interface 1912 may also include a single BB processor 1913 or a single RF circuit 1914.

Furthermore, in addition to a cellular communication scheme, the radio communication interface 1912 may support another type of radio communication scheme such as a short-distance wireless communication scheme, a near field communication scheme, and a radio local area network (LAN) scheme. In that case, the radio communication interface 1912 may include the BB processor 1913 and the RF circuit 1914 for each radio communication scheme.

Each of the antenna switches 1915 switches connection destinations of the antennas 1916 among multiple circuits (such as circuits for different radio communication schemes) included in the radio communication interface 1912.

Each of the antennas 1916 includes a single or multiple antenna elements (such as multiple antenna elements included in an MIMO antenna), and is used for the radio communication interface 1912 to transmit and receive radio signals. The smartphone 1900 may include the multiple antennas 1916, as illustrated in FIG. 19. Although FIG. 19 illustrates the example in which the smartphone 1900 includes the multiple antennas 1916, the smartphone 1900 may also include a single antenna 1916.

Furthermore, the smartphone 1900 may include the antenna 1916 for each radio communication scheme. In that case, the antenna switches 1915 may be omitted from the configuration of the smartphone 1900.

The bus 1917 connects the processor 1901, the memory 1902, the storage 1903, the external connection interface 1904, the camera 1906, the sensor 1907, the microphone 1908, the input device 1909, the display device 1910, the speaker 1911, the radio communication interface 1912, and the auxiliary controller 1919 to each other. The battery 1918 supplies power to blocks of the smartphone 1900 illustrated in FIG. 19 via feeder lines, which are partially shown as dashed lines in the figure. The auxiliary controller 1919 operates a minimum necessary function of the smartphone 1900, for example, in a sleep mode.

In the smartphone 1900 illustrated in FIG. 19, the receiving unit and the sending unit described with reference to FIGS. 12 and 13 may be implemented by the radio communication interface 1912. At least a part of the functions of the control unit and the detecting unit may be implemented by the processor 1901 or the auxiliary controller 1919.

Second Application Example

Figure 20:
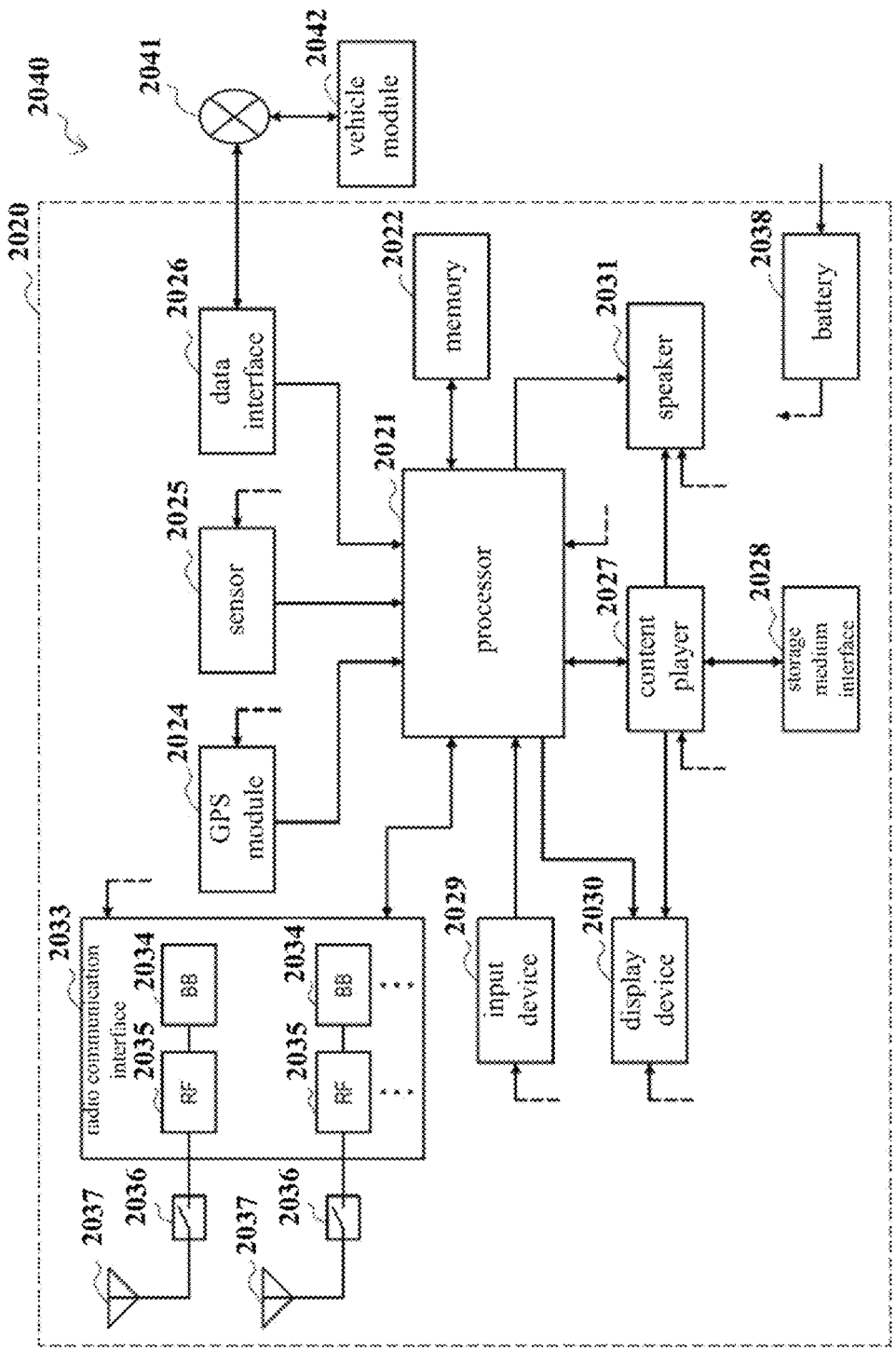
FIG. 20 is a block diagram illustrating an example of a schematic configuration of a car navigation apparatus to which the technology according to the present disclosure may be applied.

FIG. 20 is a block diagram illustrating an example of a schematic configuration of a car navigation apparatus 2020 to which the technology of the present disclosure may be applied. The car navigation apparatus 2020 includes a processor 2021, a memory 2022, a global positioning system (GPS) module 2024, a sensor 2025, a data interface 2026, a content player 2027, a storage medium interface 2028, an input device 2029, a display device 2030, a speaker 2031, a radio communication interface 2033, one or more antenna switches 2036, one or more antennas 2037, and a battery 2038.

The processor 2021 may be, for example, a CPU or a SoC, and controls a navigation function and another function of the car navigation apparatus 2020. The memory 2022 includes RAM and ROM, and stores a program that is executed by the processor 2021, and data.

The GPS module 2024 uses GPS signals received from a GPS satellite to measure a position (such as latitude, longitude, and altitude) of the car navigation apparatus 2020. The sensor 2025 may include a group of sensors such as a gyro sensor, a geomagnetic sensor, and an air pressure sensor. The data interface 2026 is connected to, for example, an in-vehicle network 2041 via a terminal that is not shown, and acquires data generated by the vehicle (such as vehicle speed data).

The content player 2027 reproduces content stored in a storage medium (such as a CD and a DVD) that is inserted into the storage medium interface 2028. The input device 2029 includes, for example, a touch sensor configured to detect touch onto a screen of the display device 2030, a button, or a switch, and receives an operation or an information input from a user. The display device 2030 includes a screen such as a LCD or an OLED display, and displays an image of the navigation function or content that is reproduced. The speaker 2031 outputs sounds of the navigation function or the content that is reproduced.

The radio communication interface 2033 supports any cellular communication scheme (such as LTE and LTE-Advanced), and performs radio communication. The radio communication interface 2033 may typically include, for example, a BB processor 2034 and an RF circuit 2035. The BB processor 2034 may perform, for example, encoding/decoding, modulating/demodulating, and multiplexing/demultiplexing, and performs various types of signal processing for radio communication. Meanwhile, the RF circuit 2035 may include, for example, a mixer, a filter, and an amplifier, and transmits and receives radio signals via the antenna 2037. The radio communication interface 2033 may also be a one chip module that has the BB processor 2034 and the RF circuit 2035 integrated thereon. The radio communication interface 2033 may include the multiple BB processors 2034 and the multiple RF circuits 2035, as illustrated in FIG. 20. Although FIG. 20 illustrates the example in which the radio communication interface 2033 includes the multiple BB processors 2034 and the multiple RF circuits 2035, the radio communication interface 2033 may also include a single BB processor 2034 or a single RF circuit 2035.

Furthermore, in addition to a cellular communication scheme, the radio communication interface 2033 may support another type of radio communication scheme such as a short-distance wireless communication scheme, a near field communication scheme, and a radio LAN scheme. In that case, the radio communication interface 2033 may include the BB processor 2034 and the RF circuit 2035 for each radio communication scheme.

Each of the antenna switches 2036 switches connection destinations of the antennas 2037 among multiple circuits (such as circuits for different radio communication schemes) included in the radio communication interface 2033.

Each of the antennas 2037 includes a single or multiple antenna elements (such as multiple antenna elements included in an MIMO antenna), and is used for the radio communication interface 2033 to transmit and receive radio signals. The car navigation apparatus 2020 may include the multiple antennas 2037, as illustrated in FIG. 20. Although FIG. 20 illustrates the example in which the car navigation apparatus 2020 includes the multiple antennas 2037, the car navigation apparatus 2020 may also include a single antenna 2037.

Furthermore, the car navigation apparatus 2020 may include the antenna 2037 for each radio communication scheme. In that case, the antenna switches 2036 may be omitted from the configuration of the car navigation apparatus 2020.

The battery 2038 supplies power to blocks of the car navigation apparatus 2020 illustrated in FIG. 20 via feeder lines that are partially shown as dashed lines in the figure. The battery 2038 accumulates power supplied form the vehicle.

In the car navigation apparatus 2020 illustrated in FIG. 20, the receiving unit and the sending unit described with reference to FIGS. 12 and 13 may be implemented by the radio communication interface 2033. At least a part of the functions of the control unit and the detecting unit may also be implemented by the processor 2021.

The technology of the present disclosure may also be realized as an in-vehicle system (or a vehicle) 2040 including one or more blocks of the car navigation apparatus 2020, the in-vehicle network 2041, and a vehicle module 2042. The vehicle module 2042 generates vehicle data (such as vehicle speed, engine speed, and trouble information), and outputs the generated data to the in-vehicle network 2041.

Preferred embodiments of the present disclosure are described with reference to the drawings above, but the present disclosure is of course not limited to the above examples. Those skilled in the art may make various alternations and modifications within the scope of the appended claims, and it should be understood that these alternations and modifications naturally fall within the technical scope of the present disclosure.

For example, in the above embodiments, multiple functions included in one unit may be implemented by separated devices. Alternatively, in the above embodiments, multiple functions implemented by multiple units may be implemented by separated devices. In addition, one of the above functions may be implemented by multiple units. As a matter of course, such configuration is included in the technical scope of the present disclosure.

In the description, steps described in the flowcharts not only include processing performed chronically in the order described, but also include processing performed concurrently or separately but not necessarily chronically. In addition, even if in steps performed chronically, as a matter of course, the order may be also changed appropriately.

The invention claimed is:

1. A device on a base station side in a wireless communication system in which there are a primary component carrier on a licensed band and a plurality of secondary component carriers on an unlicensed band, the device comprising:
a control unit configured to perform, according to an availability detection result for the plurality of secondary component carriers, power adjustment so that predetermined transmission power pre-allocated to one or more unavailable secondary component carriers is allocated to a secondary component carrier to be used among available secondary component carriers; and
a communication unit configured to send a power adjustment result of the control unit to a user equipment, the power adjustment result comprising at least information indicating whether power allocation is changed and an offset amount of the power adjustment,
wherein the communication unit is further configured to send uplink scheduling grant signaling for the plurality of secondary component carriers to the user equipment, and receive the availability detection result for the plurality of secondary component carriers reported by the user equipment according to the uplink scheduling grant signaling.

2. The device according to claim 1, wherein the communication unit is further configured to interact, via X2 signaling, the availability detection result and the power adjustment result with a neighboring base station of the base station.

3. The device according to claim 2, wherein the control unit is further configured to activate/deactivate the plurality of secondary component carriers according to a result of the interaction.

4. The device according to claim 1, further comprising:
a detecting unit configured to detect availability of the plurality of secondary component carriers to determine the unavailable secondary component carriers and the available secondary component carriers; and
a power control information generating unit configured to generate power control information comprising the power adjustment result,
wherein the control unit is further configured to perform the power adjustment according to a detection result of the detecting unit, and
the communication unit is further configured to send the power control information to the user equipment and perform downlink signal transmission according to the power adjustment result.

5. The device according to claim 4, wherein the power control information generating unit is further configured to generate the power control information for each of the plurality of secondary component carriers.

6. The device according to claim 4, wherein the power control information generating unit is further configured to generate the power control information common to the plurality of secondary component carriers.

7. The device according to claim 1,
wherein the control unit is further configured to perform the power adjustment according to the availability detection result from the user equipment, and
wherein the communication unit is further configured to comprise the power adjustment result in the uplink scheduling grant signaling to send it to the user equipment in a next cycle.

8. The device according to claim 7, further comprising:
a detecting unit configured to detect availability of a specific secondary component carrier among the plurality of secondary component carriers,
wherein the communication unit is further configured to send, if the detecting unit detects that the specific secondary component carrier is available, the uplink scheduling grant signaling to the user equipment over the specific secondary component carrier.

9. The device according to claim 7, wherein the communication unit is further configured to send the uplink scheduling grant signaling to the user equipment over the primary component carrier.

10. The device according to claim 7, wherein the control unit is further configured to perform the power adjustment by allocating resource blocks to be used for transmission blocks transmitted by the one or more unavailable secondary component carriers to a transmission block transmitted by the secondary component carrier to be used among the available secondary component carriers or by adjusting a modulation coding scheme to be used for the transmission block transmitted by the secondary component carrier to be used among the available secondary component carriers.

11. The device according to claim 7, wherein the control unit is further configured to recognize a reason of uplink data transmission failure according to the availability detection result from the user equipment, so as to adjust a size of a contention window of the plurality of secondary component carriers.

12. A device on a user equipment side in a wireless communication system, the device comprising:
a receiving unit configured to receive a power adjustment result from a base station, so that predetermined transmission power pre-allocated to one or more unavailable secondary component carriers is allocated to a secondary component carrier to be used among available secondary component carriers, the power adjustment result comprising at least information indicating whether power allocation is changed and an offset amount of the power adjustment;
a control unit configured to perform a corresponding operation according to the power adjustment result;
a detecting unit configured to detect availability of the plurality of secondary component carriers according to the uplink scheduling grant signaling; and
a sending unit configured to send a detection result of the detecting unit to the base station.

13. The device according to claim 12, wherein the receiving unit is further configured to receive power control information comprising the power adjustment result from the base station, and the control unit is further configured to obtain the power adjustment result by decoding the power control information to control a channel status information measurement result and/or a radio resource management measurement result.

14. The device according to claim 13, wherein the control unit is further configured to obtain the power adjustment result by decoding the power control information common to the plurality of secondary component carriers.

15. The device according to claim 12, wherein the receiving unit is further configured to receive uplink scheduling grant signaling for the plurality of secondary component carriers from the base station,
   wherein the power adjustment result is made by the base station according to the detection result of the detecting unit.

16. The device according to claim 15, wherein the sending unit is further configured to perform, if the detection result indicates that a specific secondary component carrier is available, uplink data transmission to the base station over the specific secondary component carrier according to the power adjustment result comprised in the uplink scheduling grant signaling in next cycle.

17. A method on a base station side in a wireless communication system in which there are a primary component carrier on a licensed band and a plurality of secondary component carriers on an unlicensed band, the method comprising:

a control step of performing, according to an availability detection result for the plurality of secondary component carriers, power adjustment so that predetermined transmission power pre-allocated to one or more unavailable secondary component carriers is allocated to a secondary component carrier to be used among available secondary component carriers; and a communication step of sending a power adjustment result to a user equipment, the power adjustment result comprising at least information indicating whether power allocation is changed and an offset amount of the power adjustment, wherein the communication unit is further configured to send uplink scheduling grant signaling for the plurality of secondary component carriers to the user equipment, and receive the availability detection result for the plurality of secondary component carriers reported by the user equipment according to the uplink scheduling grant signaling.

* * * * *